US005765062A

United States Patent [19]
Dobbs et al.

[11] Patent Number: 5,765,062
[45] Date of Patent: *Jun. 9, 1998

[54] REUSABLE FUN PHOTOGRAPHY DOUBLE EXPOSURE CAMERA

[75] Inventors: Gregg T. Dobbs; Loura L. Dobbs, both of Windermere; John M. Dobbs, Winter Garden, all of Fla.

[73] Assignee: Keepsake, Inc., Windermere, Fla.

[*] Notice: The term of this patent shall not extend beyond the expiration date of Pat. Nos. 5,613,165 and 5,546,146.

[21] Appl. No.: 757,474

[22] Filed: Nov. 27, 1996

Related U.S. Application Data

[63] Continuation-in-part of Ser. No. 686,806, Jul. 26, 1996, which is a continuation-in-part of Ser. No. 600,876, Feb. 13, 1996, Pat. No. 5,613,165, which is a continuation of Ser. No. 299,689, Apr. 19, 1994, Pat. No. 5,546,146.

[51] Int. Cl.⁶ .................................................. G03B 41/00
[52] U.S. Cl. ............................................. 396/322; 355/132
[58] Field of Search ........................... 396/6, 322; 355/39, 355/40, 43, 77, 79, 132

[56] References Cited

U.S. PATENT DOCUMENTS

| | | |
|---|---|---|
| D. 325,922 | 5/1992 | Arai . |
| 360,314 | 3/1887 | Lewis . |
| 547,855 | 10/1895 | Lee . |
| 1,268,609 | 3/1918 | Powell . |
| 3,665,828 | 5/1972 | Reiter . |
| 3,815,147 | 6/1974 | Wick . |
| 3,928,863 | 12/1975 | Stewart . |
| 4,268,144 | 5/1981 | Wheeler . |
| 4,268,150 | 5/1981 | Chen . |
| 4,310,232 | 1/1982 | Reed . |
| 4,352,555 | 10/1982 | Dobbs et al. . |
| 4,427,279 | 1/1984 | Edelstein et al. . |
| 4,655,570 | 4/1987 | Jafee . |
| 4,707,106 | 11/1987 | Johnson et al. . |

(List continued on next page.)

FOREIGN PATENT DOCUMENTS 2231463 4/1973 Germany .

OTHER PUBLICATIONS

*Lasergraphics' Digital Photography Models: Affordable, k high-quality digital film recorders designed to meet today's photogrpahers, designers and photographic labs,* Lasergraphics, Inc., Marketing Brochure, Aug. 1994.

*Primary Examiner*—David M. Gray
*Attorney, Agent, or Firm*—Allen, Dyer, Doppelt, Milbrath & Gilchrist, P.A.

[57] ABSTRACT

A fun camera provides precise registration of a latent image within a film frame with subsequent images placed on the filmstrip through exposure of the filmstrip within the camera. Rolls of film are pre-exposed with the latent image of artwork positioned within film frames. Masks are provided for insertion of the camera frame opening for shielding that portion of the film frame which contains the artwork latent image. The art work is placed onto the pre-exposed filmstrip using an imaging filmstrip formed in a continuous loop. The continuous loop having multiple artwork images thereon is rotated while a portion of the filmstrip is in contact with a portion of the bulk film for transferring the artwork image from the filmstrip to the bulk film. The bulk film is advanced while a light source exposes the film when in contact with the filmstrip. The pre-exposed bulk roll of film is punched at preselected sprocket holes corresponding to the filmstrip length for providing a reference sprocket hole within each length of film cut from the bulk roll for loading within canisters for use within the fun camera for double exposure of the film and placement of a second latent image in juxtaposition with the artwork. Improvements to the fun camera film advancing mechanism permits precise movement of the film and indexing of the film using a sprocket hole count for providing improved registration of the multiple images juxtaposed within the film frames.

20 Claims, 10 Drawing Sheets

U.S. PATENT DOCUMENTS

| | | |
|---|---|---|
| 4,801,957 | 1/1989 | Vandemoere . |
| 4,816,848 | 3/1989 | Doyle, Jr. . |
| 4,827,291 | 5/1989 | Guez . |
| 4,882,600 | 11/1989 | Vandemoere . |
| 4,896,176 | 1/1990 | Barrett . |
| 4,994,832 | 2/1991 | Spector . |
| 5,045,871 | 9/1991 | Reinholdson . |
| 5,111,224 | 5/1992 | Spector . |
| 5,142,311 | 8/1992 | Olson . |
| 5,187,512 | 2/1993 | Kirkendall . |
| 5,189,467 | 2/1993 | Wheeler . |
| 5,235,366 | 8/1993 | Kucmerowski . |
| 5,546,146 | 8/1996 | Dobbs et al. ............... 396/322 |
| 5,565,936 | 10/1996 | Kim et al. . |
| 5,613,165 | 3/1997 | Dobbs et al. ............... 396/322 |

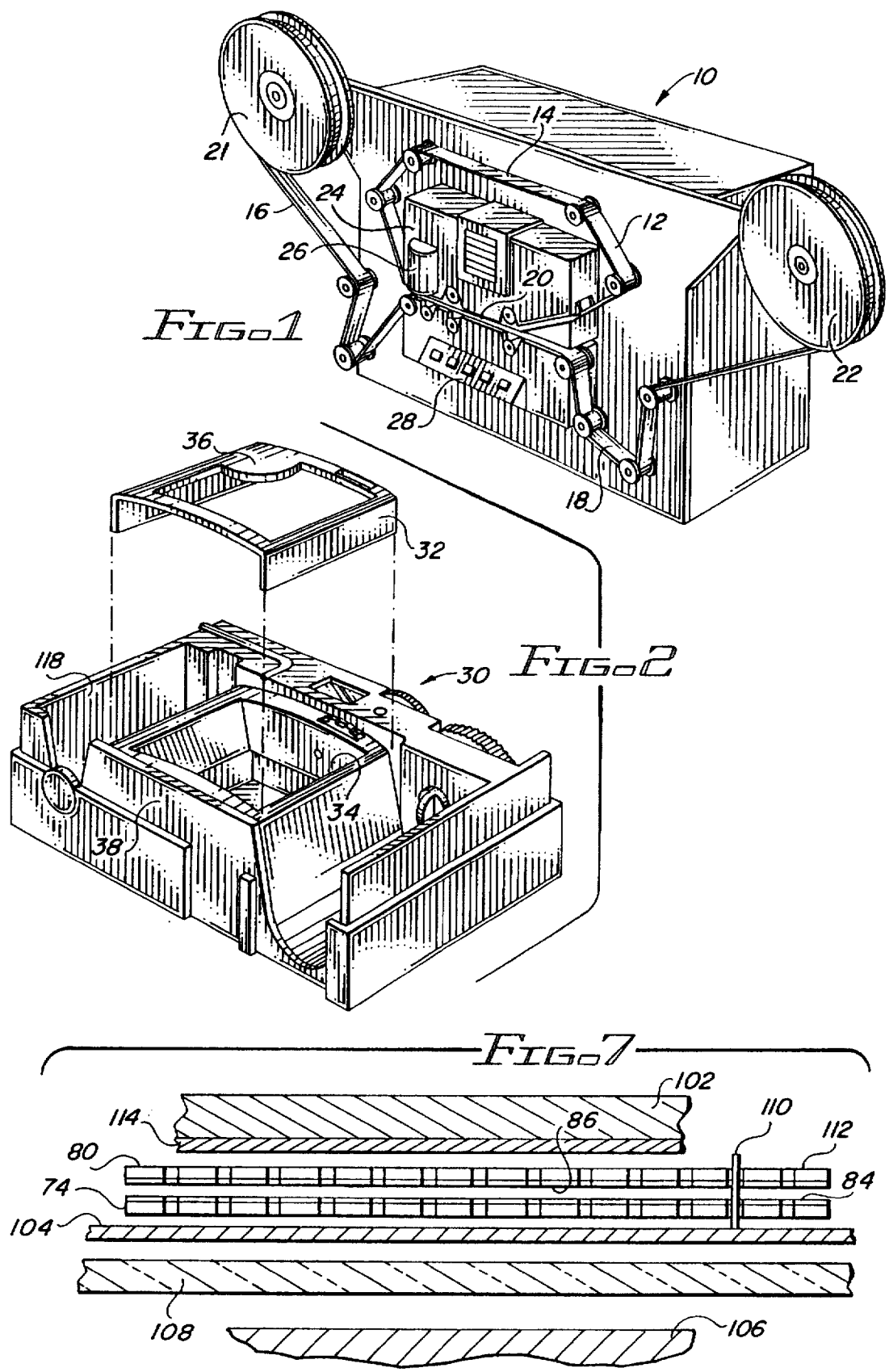

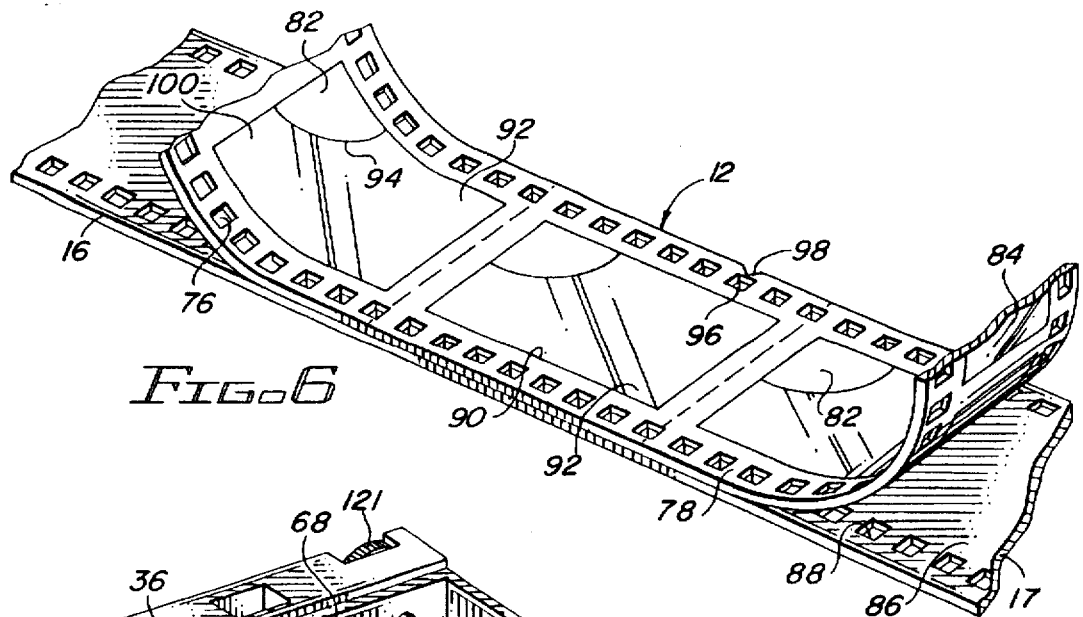
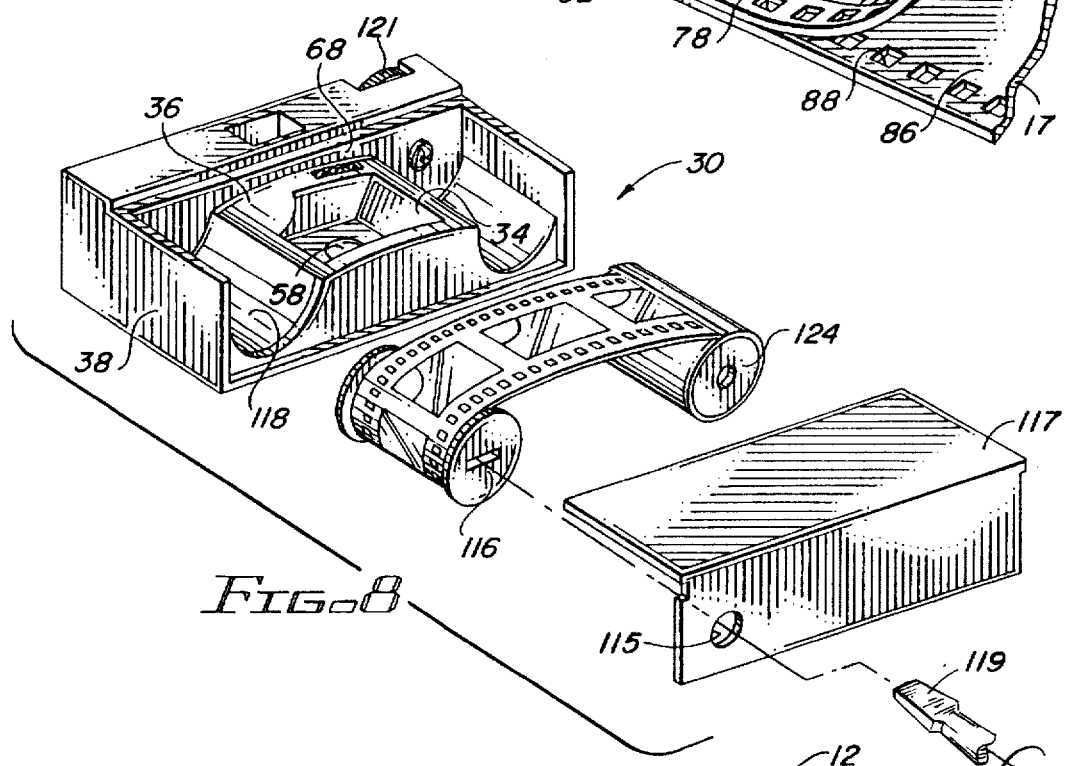
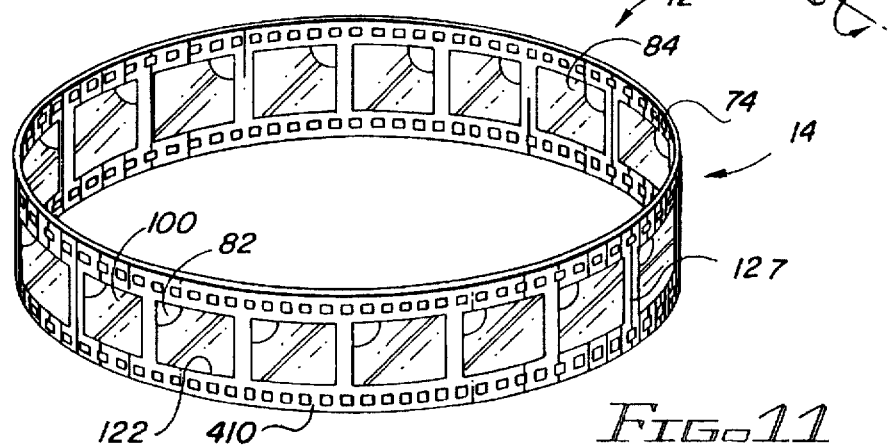

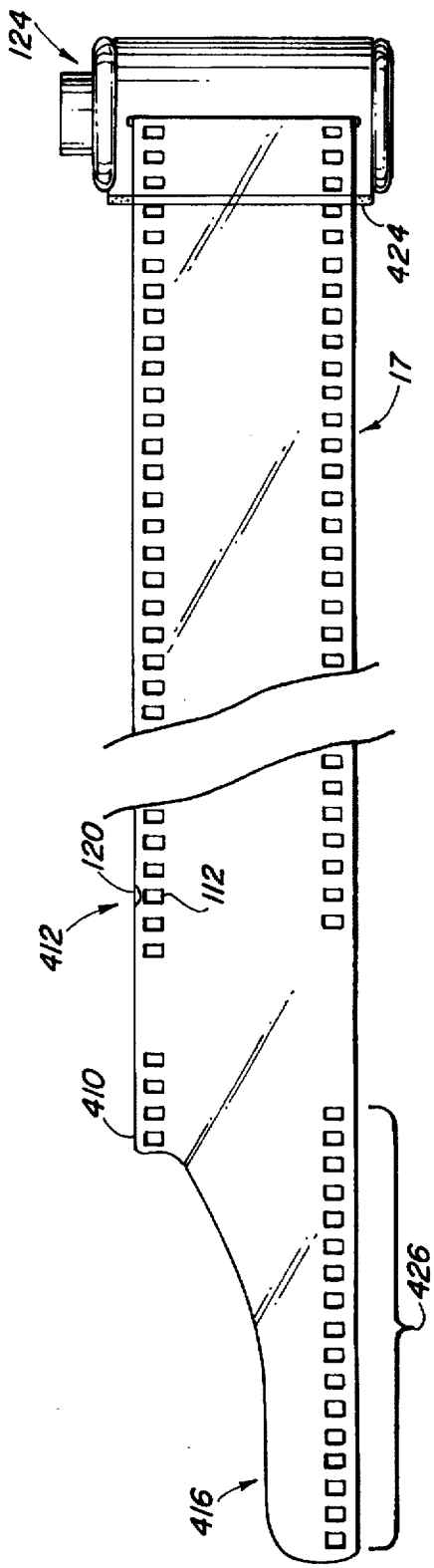
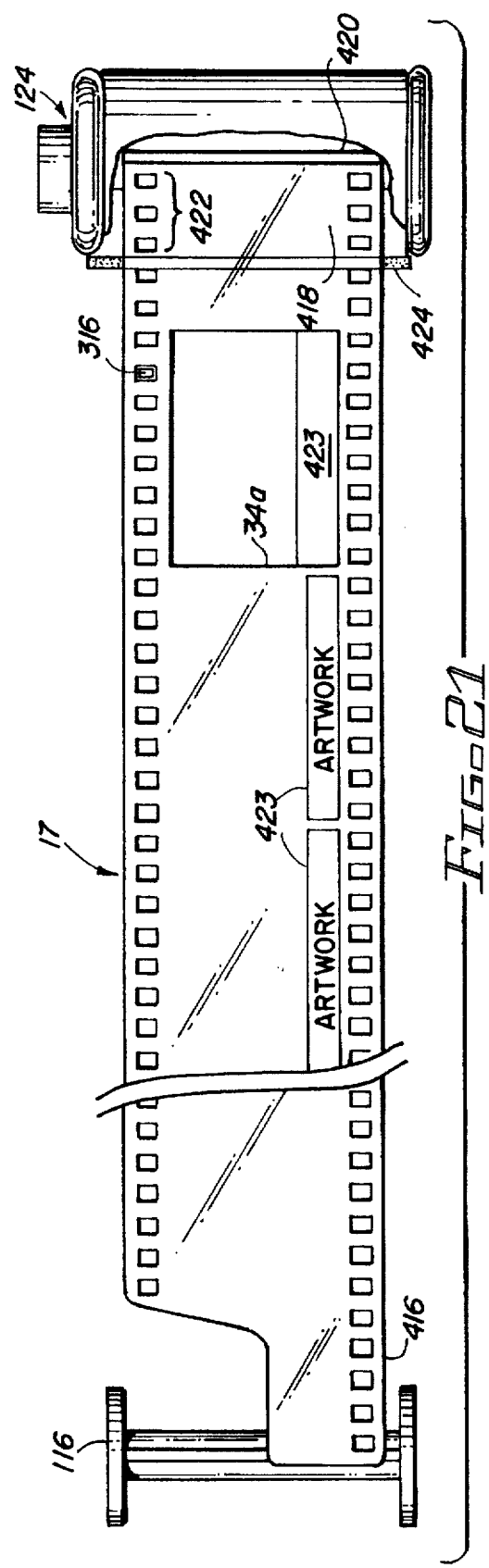

5,765,062

REUSABLE FUN PHOTOGRAPHY DOUBLE EXPOSURE CAMERA

CROSS REFERENCE TO RELATED APPLICATION

This application is a continuation-in-part of pending application Ser. No. 08/686,806 filed Jul. 26, 1996 for "Photographic Film Pre-Exposure Apparatus and Method," which itself is a continuation-in-part application of Ser. No. 08/600,876, filed Feb. 13, 1996, for "Photographic Film Pre-Exposure Method", now U.S. Pat. No. 5,613,165, which was a continuation of Ser. No. 08/299,689, filed Apr. 19, 1994 for "Single Use Camera Film Pre-Exposure Method", now U.S. Pat. No. 5,546,146, issued Aug. 13, 1996, commonly assigned with the present invention.

BACKGROUND OF THE INVENTION

1. Field of the Invention

The invention relates to an apparatus and method for pre-exposing photographic film and positioning a pre-exposed image within a film frame for subsequent exposure and development into a photograph. In particular, the invention relates to pre-exposing a roll of film with latent images to be placed in registration within respective film frames for desirable alignment of each image within film frames produced by an inexpensive reusable camera having improved operation for providing desirable pre-exposed image registration within the film frame, the film being loaded in the camera by the user.

2. Description of Background Art

Single use and inexpensive reusable cameras are well known in the art. They have proven particularly popular for fun photography requiring little more than an "aim and shoot" technique to create pleasing photographs. In an effort to further develop fun and excitement centered around the use these cameras, many techniques have been developed for pre-exposing the film to be loaded within the camera for placing a latent image on film frames to create a pleasing photograph having the pre-exposed image in juxtaposition with a subject photographed by the single use camera.

U.S. Pat. No. 5,235,366 to Kucmerowski discloses a well known recyclable, single use photographic film package and camera having a roll of film withdrawn from its film canister and wound on a film winding reel disposed on one side of an exposure opening within the light tight camera casing. The canister is disposed on the other side of the exposure opening within the casing. An externally operable film winding thumbwheel is provided for winding the film past the shutter and image area into its canister as the film is exposed frame by frame. When all frames are exposed, the package is recycled after processing the exposed film by substituting a fresh roll of film and new packaging for resale. Such a reusable camera is produced at a relatively low cost and has been shown to be very popular for fun photography.

U.S. Pat. No. 5,187,512 to Kirkendall discloses a film cassette containing pre-exposed film. During manufacture, each frame of a filmstrip has one portion masked while the frame is exposed to light. The light impinges on a second portion of the frame to form a latent image. The filmstrip is then mounted within a camera where a previously unexposed portion of the frame is exposed to a second image bearing light, while the pre-exposed portion of the frame is masked from the second light. The strip of film is then removed from the camera for developing juxtaposed latent images in a single photograph. Kirkendall '512 discloses pre-exposing a filmstrip to a single image located within a non-opaque area of a template or mask during manufacturing of the pre-exposed filmstrip and then masking a portion of a single use camera aperture frame opening for shielding that portion of the pre-exposed filmstrip having a latent image.

U.S. Pat. No. 5,546,146 to Dobbs et al. for a "Single Use Camera Film Pre-Exposure Method" discloses pre-exposing film so as to overcome alignment problems associated with the placement of desired artwork within the film frame beginning with exposure of the artwork for exposure through placement of the pre-exposed film within the camera. As described, if the pre-exposed film is loaded within the camera while out of alignment with the camera film frame by only one sprocket hole, the resulting double exposed photograph will not be pleasing, and as has been experienced in the industry, will be viewed as undesirable by the user. While fun cameras are becoming less and less expensive, thus more and more desirable, users continue to expect the precision of the more sophisticated, more expensive, high precision 35 mm cameras. The Dobbs patent discloses a method for exposing film with a latent image, wherein the image is placed within precise registration with any subsequent image exposed within the film frame. One embodiment of the invention included the formation of an imaging filmstrip having artwork placed within multiple film frames. The imaging filmstrip is formed within a loop for positioning against an unexposed filmstrip for pre-exposing the unexposed filmstrip with the images placed on the loop of imaging filmstrip.

The present invention addresses the need for providing pre-exposed film and proper alignment of the film within an inexpensive camera, yet have such a camera operate for providing proper registration of the pre-exposed film with the camera film frame.

SUMMARY OF THE INVENTION

It is thus an object of the present invention to provide improvements to such inexpensive single use and reusable cameras such that registration of a latent image with a subsequent exposure image within the same film frame provides a double exposure photograph pleasing to the user. It is further an object to provide such a camera and method of loading the camera by the user.

When unexposed film comprises a bulk roll of film, the bulk roll of unexposed filmstrip is exposed to a multiplicity of frames by forming an imaging filmstrip into a continuous loop. A reference sprocket hole is identified within predetermined lengths of film for aligning film cut from the bulk roll within the camera. During exposure of the bulk film, a portion of the imaging filmstrip is placed in contact with a portion of the unexposed bulk roll film. The bulk roll and imaging filmstrip loop are advanced past a light source for pre-exposing the unexposed bulk roll film to frames of the imaging film. The bulk roll film and imaging filmstrip loop continue to be advanced past the light source for exposing the bulk roll film to the images on the imaging filmstrip, thereby placing latent images onto the bulk roll film. The bulk roll is marked at predetermined distances from a reference sprocket hole for providing reference sprocket holes within each length of film to be cut for use in the camera. Distances between reference sprocket holes fall within the predetermined filmstrip lengths. The bulk roll is then cut into the predetermined filmstrip lengths, each having the referenced sprocket hole. The predetermined lengths are loaded onto storage spools for placement in the camera. As described in the Dobbs et al. patent, the referenced sprocket hole of the filmstrip is then positioned at a leading end of the strip extending from the storage spool thereby providing for positioning a reference frame for aligning with the exposure frame of the single use camera.

By using an overlay within the camera that was used to place the latent image within the imaging filmstrip film frames, proper registration of the artwork within the frame of the pre-exposed filmstrip is achieved. Identifying a referenced sprocket hole positions a frame within exposure frame opening of the single use camera. Providing a border around the artwork permits slight movement of the pre-exposed film within the single use camera while maintaining proper alignment of the artwork within its shielded portion. Such steps as described provide for proper registration of the latent image placed within a frame for subsequent exposure of the frame using the single use camera.

One embodiment of the present invention includes the steps of providing an imaging filmstrip having multiple film frames, each film frame having an opaque portion and an image portion, the image portion having an artwork image therein, forming the imaging filmstrip into a continuous loop, placing a portion of the imaging filmstrip in contact with a corresponding contact portion of unexposed film, passing light through the filmstrip contact portion to the film contact portion for exposing the unexposed film contact portion and placing a latent image of the filmstrip artwork onto the film, thus providing a pre-exposed film having the latent image within the an image portion of a film frame corresponding to the image portion of the imaging filmstrip frame, and rotating the imaging filmstrip while advancing the unexposed film past the light for placing continuous filmstrip portions in contact with contiguous film portions along a length of the film, thus placing multiple latent images onto the film, the multiple images corresponding to the artwork images of the filmstrip.

A photographic film pre-exposure apparatus useful in pre-exposing a bulk roll of film prior to preparation of the film for use in a camera comprises a light source for exposing film placed on an opposing contact surface with a latent image of filmstrip artwork when a filmstrip having artwork image is positioned between the film and the light source, a contact surface opposing the light source, means for transferring unexposed film across the contact surface, a portion of the unexposed film positioned between the contact surface and the light source for exposing the film portion to light, and imaging filmstrip mounting means for mounting a continuous filmstrip loop, the mounting means cycling the loop for placing a portion of the filmstrip in contact with the film, a portion of the imaging filmstrip positioned between the film contact portion and the light source.

This and other objects, advantages and features of the present invention are provided by a photographic film double exposure method comprising the steps of providing an imaging filmstrip having a series of film frames. Each frame has a masking portion and an artwork portion. The artwork portion has an artwork image. It is expected that the image will contain a message and decorative artwork or simply a message that a user desires be placed onto a photograph. The method further comprises the steps of forming a continuous filmstrip loop by connecting opposing ends of the imaging filmstrip, providing a supply reel having a roll of unexposed bulk film thereon, placing a light source proximate a first imaging filmstrip side, feeding the supply reel film proximate a second imaging filmstrip side, and exposing the unexposed bulk film to light for placing a latent image of the imaging filmstrip artwork onto the bulk film thus forming pre-exposed bulk film. The filmstrip loop is continuously rotated for progressively placing the series of frames proximate the bulk film for exposing the bulk film to the series of artwork images. A notch is punched at preselected locations along the pre-exposed bulk film. Each notch is positioned proximate a reference sprocket hole. The pre-exposed bulk film is feed onto a take-up reel. The pre-exposed bulk film is then cut into preexposed filmstrips having a preselected length and number of frames. Each pre-exposed filmstrip has at least one notch proximate a filmstrip leader end for identifying the reference sprocket hole for that filmstrip. The cut preexposed filmstrip is loaded into a light tight film canister. The filmstrip is loaded such that a portion of the leader end extends out of the canister for ease of the user in feeding the filmstrip from the canister to a take-up spool. A camera is provided having a sprocket gear wheel communicating with a thumbwheel for advancing the filmstrip between the canister and a take-up spool. The sprocket gear wheel has a reference gear tooth. The camera operates such that the gear wheel is locked for positioning the reference tooth for receiving the filmstrip reference sprocket hole. An overlay is placed onto the camera film frame opening. The overlay has a shielded portion for preventing exposure of the filmstrip preexposed artwork image during operation of the camera. The overlay has an opening which forms a frame opening for exposing the unexposed portion of the preexposed filmstrip. The film canister is then loaded into the camera and the filmstrip leader end is pulled over the camera frame opening while positioning the reference sprocket hole onto the reference gear tooth. The leader end is fed onto the take-up spool. The camera is closed for operation in doubly exposing the pre-exposed filmstrip. In initially setting the filmstrip into position, the filmstrip is wound from the canister onto the take-up spool for a predetermined length of filmstrip. The filmstrip is then advanced into the canister for placing a first frame to be exposed across the film frame opening. To aid the user in identifying exposed frames, a film wheel counter is initialized. The camera is operated for exposing the first frame and continues to be operated for exposing the series of preselected frames. The filmstrip is fully wound into the canister after all preselected framed are doubly exposed, and the canister is then removed from the camera for developing the doubly exposed filmstrip.

BRIEF DESCRIPTION OF THE DRAWINGS

A preferred embodiment of the invention as well as alternative embodiments are described by way of example with reference to the accompanying drawings in which:

FIG. 1 is a perspective view of a bulk roll film exposure apparatus of the present invention;

FIG. 2 is a perspective partial exploded view of a camera and overlay;

FIG. 6 is a partial perspective view of an imaging filmstrip portion in contact with a portion of an unexposed filmstrip;

FIG. 7 is a partial cross-sectional view of a platen and exposure plate assembly illustrating exposure of an unexposed film to an image of an imaging film;

FIG. 8 is an exploded perspective view of a camera and pre-exposed filmstrip;

FIG. 11 is a perspective view of the imaging filmstrip formed into a loop for use in a bulk film pre-exposure apparatus of the present invention;

FIG. 19 is a top plan view of a filmstrip and canister;

FIG. 21 is a fragmented view of the filmstrip and canister of FIG. 19; and

DETAILED DESCRIPTION OF PREFERRED EMBODIMENT

Figure 3A:
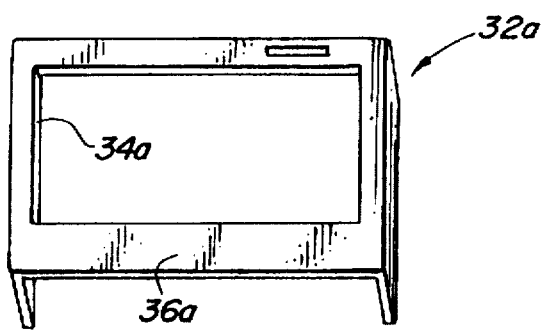
FIGS. 3a and 3b are perspective views of alternate overlay embodiments.

The present invention will now be described more fully hereinafter with reference to the accompanying drawings, in which preferred embodiments of the invention are shown. This invention may, however, be embodied in many different forms and should not be construed as limited by the embodiments set forth herein. Rather, these embodiments are provided so that this disclosure will be thorough and complete, and will fully convey the scope of the invention to those skilled in the art. Like numbers refer to like elements throughout.

With reference to FIG. 1, an apparatus 10 employs an imaging filmstrip 12 formed into a continuous loop 14 for positioning against unexposed filmstrip 16 of a bulk film roll for pre-exposing the unexposed filmstrip 16 with an image formed on the imaging filmstrip 12. The apparatus 10 is configured for passing the unexposed filmstrip 16 loaded on a filmstrip supply reel 21 through a slot 20 and onto a take-up reel 22. As will be described in detail herein, the imaging filmstrip 12 in the form of loop 14 and unexposed filmstrip 16 are held in contact while a light source causes a series of artwork images of the imaging filmstrip 12 to be placed as a series of latent images on the unexposed filmstrip 16, thus becoming pre-exposed filmstrip 18. In the preferred embodiment of the present invention, positive transparency film is used for the imaging filmstrip 12 and negative film for the unexposed filmstrip 16. As will be described later in this section, a filmstrip notch punch assembly 26 marks the unexposed filmstrip 16 at pre-selected locations for identifying a reference sprocket hole 96 as will be described later with reference to FIGS. 6 and 9. The notch punch assembly 26 is positioned for punching a notch 98 within the filmstrip 18 after it has been exposed and prior to loading onto the take-up reel 22. As will be discussed later in this section, the notch 98 provides a recognizable reference for a person loading pre-exposed film within a camera. The apparatus 10 can be programmed to expose predetermined lengths of unexposed filmstrip 16. Such programming is done through the use of a computer 28 accessible to an operator of the apparatus 10.

Figure 3B:
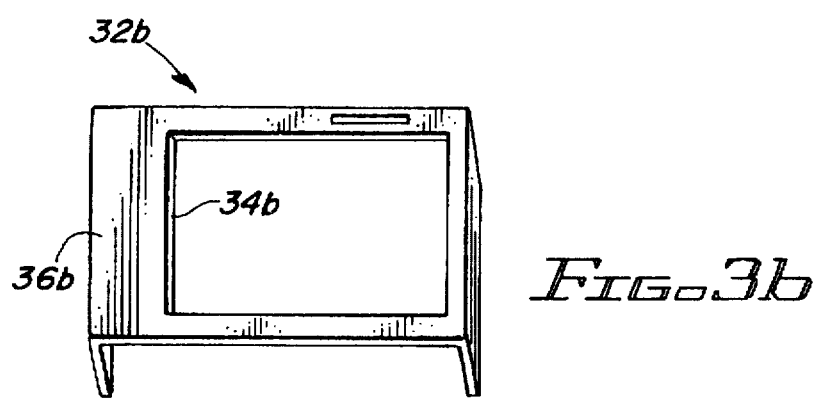

The apparatus 10 and a method are provided for pre-exposing the unexposed filmstrip 16, under bulk film loading conditions, to an image positioned for alignment in proper registration with a film frame of a camera 30 for a section of the bulk roll of film cut to a predetermined length. In one embodiment of the present invention, and as described with reference to FIG. 2, the camera 30 has an overlay 32 for blocking a portion of a camera exposure frame opening 34. The overlay 32 shields a portion 36 of a film frame opening 34. As further illustrated in FIG. 2, the shielded portion 36 is provided by the overlay 32. As illustrated in FIGS. 3a and 3b, the shielded portion 36 in alternative overlay embodiments are provided by forming the camera exposure frame opening 34 as an integral part of the camera body 38.

Figure 4:
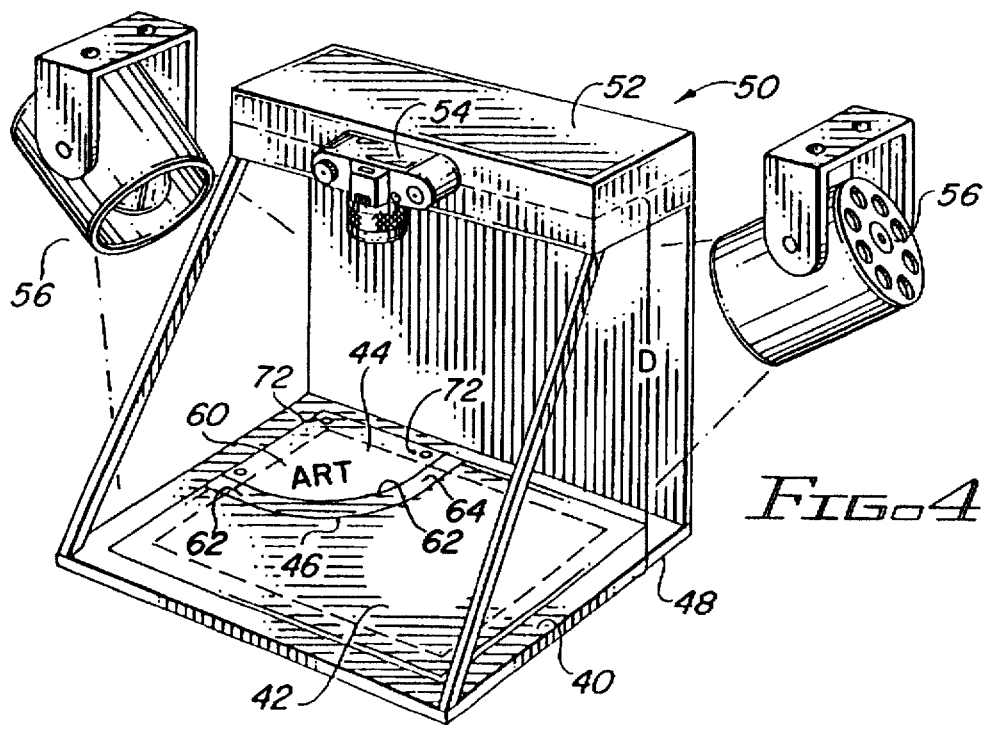
FIG. 4 is a perspective view of a copy stand useful in forming an imaging filmstrip of the present invention.

As described in the above referenced Dobbs et al. patent, the proper formation of the shielded portion 36 is necessary to provide a desirable registration of art work images placed within the shielded portion 36. To configure the shielded portion 36, as illustrated with reference to FIG. 4, a surface 40 is formed to have a black portion 42 and a white portion 44. The white portion 44 identifies an artwork image area 46 that will be seen to correspond to the shielded portion 36 within the camera frame opening 34. In one embodiment of the present invention, the surface 40 is on a base 48 of a copy stand 50.

Again with reference to FIG. 4, the copy stand 50 has a support member 52 dimensioned to hold a copy camera 54 at a predetermined distance "D" from the surface 40. Imaging light sources 56 are positioned to provide imaging light onto the surface 40. In an the embodiment illustrated by way of example, the copy camera 54 is a 35 mm single reflex camera well-known for its high resolution and precision. In one embodiment of the present invention, 35 mm filmstrips are used in the various steps to be compatible with 35 mm film typically used in fun cameras such as a single use camera to which the present invention is directed but as earlier described, not limited. It is understood that the present invention including the methods and apparatus disclosed will be used with other film formats.

In preparing the imaging filmstrip 12, an overlay filmstrip is mounted within the copy camera 54. With light from the light sources 56 impinging on the surface 40, the surface 40 (having the black portion 42 and white portion 44) is photographed using the copy camera 54. The overlay filmstrip is thus exposed to the black and white portions 42 and 44 for forming a frame on the overlay filmstrip having a latent image of the portions 42 and 44 within the frame. The overlay filmstrip is developed. A developed frame is then used to form the overlay 32. In the preferred embodiment of the present invention, the overlay 32 is formed using well-known photo etching methods. One embodiment of the overlay 32 comprises a brass sheet. In an alternative embodiment of the present invention, the developed overlay filmstrip frame is used to form the shielded portion 36 as an integral part of the single use camera body 38 to form the exposure frame opening 34 of the camera 30 as illustrated again with reference to FIG. 3.

Figure 9:
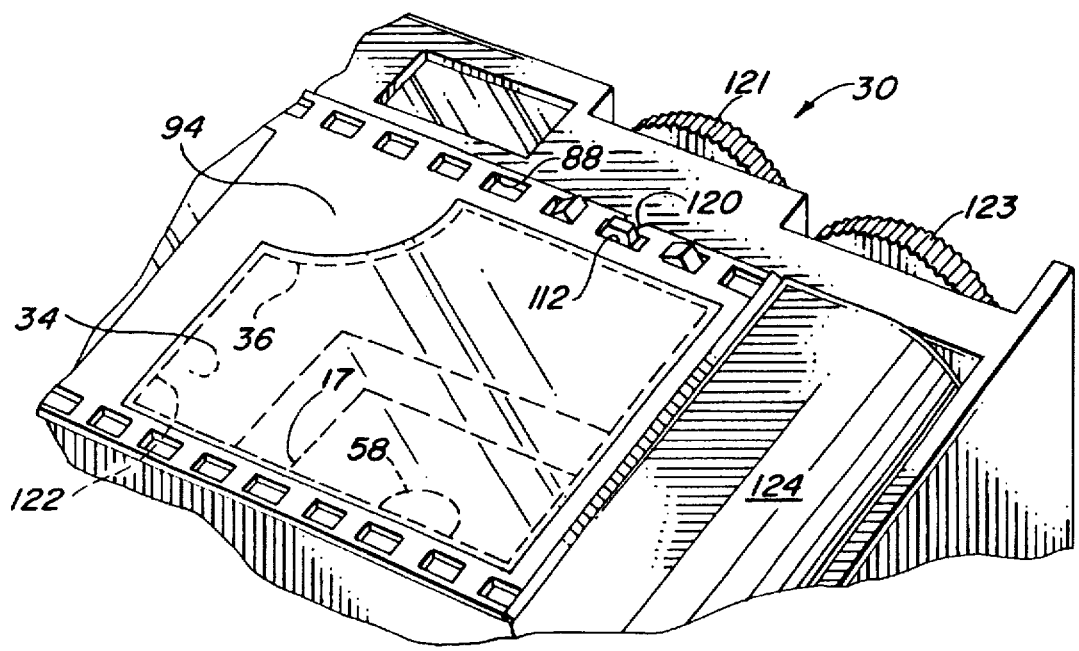
FIG. 9 is a partial perspective view of pre-exposed film loaded within a camera.
Figure 10:
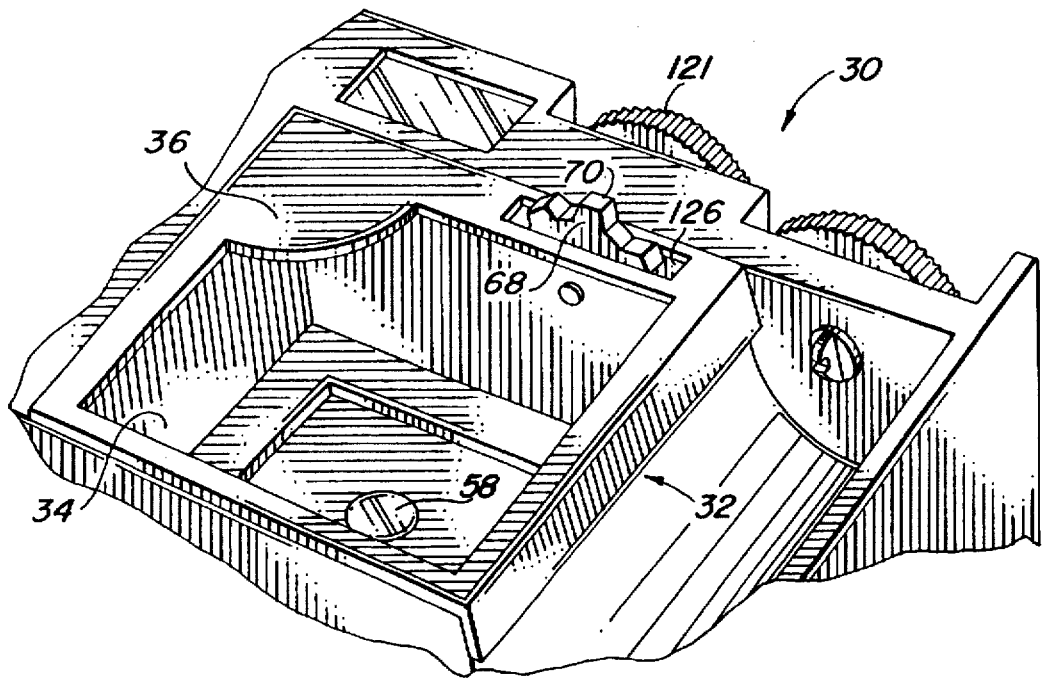
FIG. 10 is a partial perspective view of an open-back for a camera illustrating placement of an overlay.

As illustrated again with reference to FIG. 2, and to FIGS. 9 and 10, the camera 30 has the exposure frame opening 34 of a predetermined configuration having the shielded portion 36 for defining the artwork image area 46 corresponding to that portion of the film frame within which a latent image of the art work is placed for ultimate development of pre-exposed film. Once the camera 30, as illustrated again with reference to FIG. 2, has the film frame 34 formed, a second or alignment filmstrip is mounted within the camera 30 having the formed frame opening 34 with its shielded portion 36. The alignment filmstrip is exposed to light sufficiently bright to form a latent image of the exposure frame opening 34 onto a frame of the alignment filmstrip. In the preferred embodiment of the present invention, the alignment filmstrip is exposed to bright sunlight through a lens 58 of the camera 30. The alignment filmstrip, a positive transparency film, by way of example, as described earlier, is developed to form a film frame corresponding to the exposure frame opening 34. The artwork image area 46 is opaque and the open area defined by the exposure frame opening 34 is clear after the film has been developed. The developed alignment filmstrip is mounted within the copy camera 54 such that the surface 40 upon which art work will be placed, can be viewed through an open back of the copy camera 54. By viewing the surface 40 through the developed alignment filmstrip mounted in the copy camera 54, the artwork image area 46 is clearly defined by the opaque portion of the alignment filmstrip frame. In this way, the artwork image area 46 has now been defined in registration with the exposure frame opening 34 of the single use camera 30.

Again with reference to FIG. 4, artwork 60 having an edge portion 62 is placed within an area of the film frame earlier defined as the artwork image area 46 on the surface 40. In the preferred embodiment, the artwork edge portion 62 forms a gap 64 with the artwork image area edge 62. Such a gap 64 allows for some movement of pre-exposed filmstrip mounted within the camera 30 due to the likely movement of a sprocket gear wheel 68, because of loose tolerances of the wheel 68, or because of filmstrip movement due to differences between a sprocket wheel gear tooth 70 affixed within a sprocket hole of the filmstrip not sized precisely with the sprocket wheel gear tooth 70. In one embodiment of the present invention, the gap 64 is approximately ³⁄₁₆"wide. Further, the exposure frame opening 34 is sized slightly larger than the artwork area 46 when the artwork 60 comprises a primarily black outer portion and the exposure frame opening 34 is sized slightly smaller than the artwork 60 when the artwork outer or perimeter portion comprises primarily a white border.

As illustrated again with reference to FIG. 4, the artwork 60 is placed within the artwork image area 46. The copy camera 54 is then loaded with a third filmstrip or the imaging filmstrip 12 (here in its unexposed condition) for exposing the imaging filmstrip 12 to the artwork 60 for forming a latent image of the artwork onto the imaging filmstrip 12. A predetermined number of frames within a series is exposed to the artwork 60 illuminated by imaging light source 56. The artwork 60 is held in position by registration pins 72. Flat artwork 60 is illustrated here by way of example. However, it is expected that artwork 60 will be three-dimensional or two-dimensional in form. When the artwork 60 is of a two-dimensional form, a rigid transparent sheet 66 is placed over the two-dimensional artwork for holding the artwork 60 in a fixed single plane for focusing the copy camera 54 onto that plane thereby providing a sharply defined image of the artwork 60 onto the imaging filmstrip. The artwork 60 is photographed onto a predetermined number of frames of the imaging filmstrip 12. It is anticipated that the artwork 60 is replaced with alternative works of art of similar or varying format. The alternative artwork is held within the artwork image area 46 as described for the artwork 60. Again, a predetermined number of frames of the imaging filmstrip 12 is exposed to the alternative artwork. In preferred embodiments, the imaging filmstrip 12 comprises 12, 18, 24 and 36 exposures based on the predetermined nature of the resulting camera pre-exposed film planned. The imaging filmstrip 12 is developed having a series of frames wherein each frame includes the artwork 60 or, in the alternative, a variety of artwork.

Figure 5:
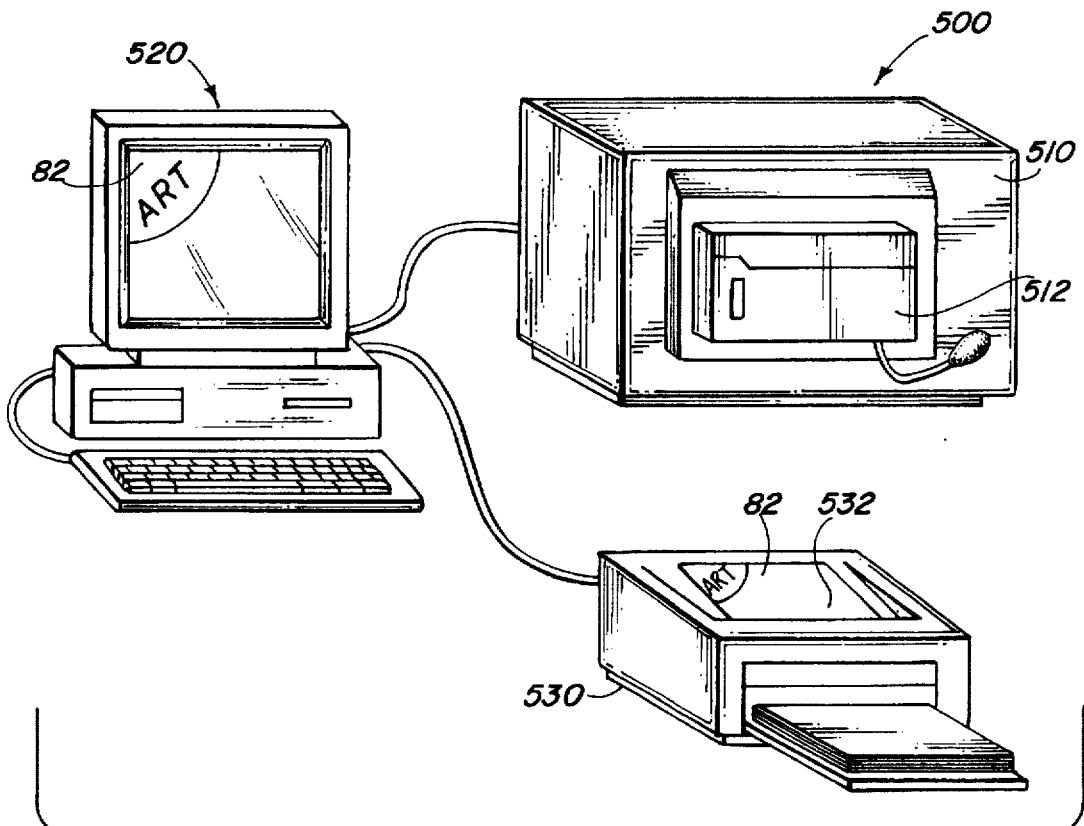
FIG. 5 is a partial diagrammatic view of a computer imaging system for creating an artwork image.

As herein described, the imaging filmstrip 12 is prepared with the artwork images 82 precisely placed within film frames 74 of the filmstrip 12, as illustrated and described with reference to FIG. 11, for the filmstrip 12 formed into the filmstrip loop 14. As illustrated with reference to FIG. 5, in an alternative method and system 500 of precisely placing the artwork images 82 onto the imaging filmstrip 12, the artwork image 82 is created using one of two known color systems, the RBG spectrum or the CMYK Process system. The colors created by these color systems are in turn used to create the artwork image 82 that will be pre-exposed onto the imaging filmstrip 12. The system 500 is employed to create new or reproduce the artwork 60 that will be output to a laser film recorder 510, an instrument used to record or write images directly onto film from a graphics computer 520 to produce the imaging filmstrip 12 and the loops 14. It is important to note that the loops 14 used by the imprinter apparatus 10 can be created using either of the two systems. However, if the laser film recorder 510 is used to create the master loop 14 instead of the method above described, then the CMYK Process artwork must be converted to the RGB spectrum. Conversely, RGB spectrum artwork must be converted to CMYK if it is to be shot using a Nikon SLR and copy stand 50, as earlier described.

The artwork 82 is created on the computer 520 using graphic design software which is output to either a color laser copier 530 of output directly to the imaging filmstrip 12 via the laser film recorder 510. If the artwork 82 is created using flat art such as on paper 532, then the art is trimmed and placed onto the copy stand 50 and photographed in the order of exposure onto the imaging filmstrip 12, as earlier described. If the artwork 82 is created within a camare back 512 using the film recorder 510, then it is imaged directly onto the imaging filmstrip from the computer 520. In either case, once the imaging filmstrip 12 has been exposed, it is developed and spliced end to end, creating the loop 14. In one embodiment of the system 500, a LASERGRAPHICS, INC. digital photography model film recorder is used for the recorder 510. The loop 14 is then ready to install onto the apparatus 10 for the contact printing process.

As illustrated with reference to FIG. 6, the developed imaging filmstrip 12, having sprocket holes 76 along edge portions 78 is aligned with an unexposed filmstrip 16, as illustrated again with reference to FIG. 1 to that portion of the bulk film leaving the supply reel 18 for exposure when passing through the slot 20 and loading onto the take-up reel 22 as exposed filmstrip 17, for the purpose of exposing the unexposed filmstrip 16 to the artwork 60 for providing an artwork image 82 within an artwork portion 94 of the imaging filmstrip frame 90 as earlier described. In the preferred embodiment, an emulsion surface 84 of the imaging filmstrip 12 is placed against an emulsion surface 86 of the unexposed filmstrip 80, as illustrated again with reference to FIG. 6. The sprocket holes 76 of the imaging filmstrip 12 are aligned with sprocket holes 88 of the unexposed filmstrip 16. As is understood by those skilled in the art, those steps involving the use of unexposed film is carried out within darkroom environment conditions. Further, again with reference to FIG. 6, and as appreciated from the previous discussion, each frame 90 of the imaging filmstrip 12 has an opaque portion 92 corresponding to the black portion 42 of the surface as earlier described and an image portion 94 having an image of the artwork 60 as was positioned within the artwork image area 46 as described earlier. Once the sprocket holes 88 and 76 have been aligned, a reference sprocket hole 96 is marked with a notch 98 for positioning a pre-exposed filmstrip image in registration with the exposure frame opening 34 of the camera 30. As further illustrated with reference to FIG. 6, a second surface 100 of the imaging filmstrip 12 is exposed to light sufficiently bright for for placing a latent image of the artwork 60 onto the filmstrip 80.

In one embodiment of the present invention, the unexposed filmstrip 80 is configured as a pre-determined length. By way of example, typical 35 mm filmstrip is prepared for permitting exposure of 12, 18, 24 or 36 frames. A corresponding imaging filmstrip 12 is used to expose a single unexposed filmstrip 80 as illustrated in FIG. 7. A platen 102 is provided for holding the filmstrip first surfaces 84 and 86 in uniform contact with each other. The platen 102 is dimensioned for covering the filmstrips 12 and 16 which are placed onto an exposure plate 104. In one embodiment, a light source 106 is provided in the form of an incandescent light for distributing light uniformly onto the exposure plate 104. A diffusion grid 108 is placed between the light source 106 and the exposure plate 104 for diffusing light and ensuring that a uniform exposure of the exposure plate 104 and thus the filmstrip 12 is provided. The imaging filmstrip 12 is placed onto a surface of the exposure plate 104. The unexposed filmstrip 16 is aligned with the imaging filmstrip 12 using an alignment pin 110. As described earlier, the preselected reference sprocket hole 96 is marked by forming a notch 98 at the reference sprocket hole 96 for aligning the unexposed filmstrip 16 once the pre-exposed filmstrip 17 in the camera 30 for subsequent exposure. To further provide uniform contact of the filmstrip surfaces 84 and 86, a pad 114 is affixed to a surface of the exposure plate 104. Again, as is well known in the art, such steps discussed take place in a darkroom environment.

With reference to FIG. 8, the now pre-exposed filmstrip 17 of a predetermined length, is loaded onto a take-up spool 116 adapted to fit within a film roll receiving cavity 118 of the camera 30. The leading edge of the filmstrip 17 having the preselected reference sprocket hole 96 with a notch 98 as illustrated with reference to FIG. 9 is positioned within the camera 30 such that the artwork image portion 94 will be shielded by the shielded portion 36 and the exposure frame opening 34 is aligned with a filmstrip frame 122 of the pre-exposed filmstrip 17. As again illustrated with reference to FIG. 9, a preselected sprocket hole 112 is marked by forming the notch 120 at the reference sprocket hole 112 for aligning the pre-exposed filmstrip 17. As is well known for the fun cameras 30, a film cassette 124 is used to take up subsequently exposed filmstrip frames 122. The filmstrip 17 is removed from the camera 30 once second exposures have been made by a user. The now doubly exposed filmstrip 17 is then processed by well known film developing methods.

With reference to FIG. 10, the overlay 32 in one preferred embodiment has a slot 126 along a peripheral portion of the overlay 32 for permitting gear teeth 70 of a sprocket wheel 68 to extend beyond the overlay 32 and communicate with the sprocket holes 88 of the pre-exposed film 17 as described with reference to FIG. 9. With such an overlay 32, existing cameras 30, such as single use cameras are easily and inexpensively adapted for use with the pre-exposed film 17.

As was discussed earlier with reference to FIG. 1, in the apparatus 10, the imaging filmstrip 12 is formed into the continuous loop 14. With reference to FIG. 11, the loop 14 is formed from the imaging filmstrip 12 by affixing ends of the imaging filmstrip with a splice 127. A predetermined number of frames 90 is then established for the loop 14. In one embodiment of the present invention, imaging filmstrip 12 having 24 frames is used. It is anticipated that alternative numbers of frames 90 will be incorporated by those pre-exposing film to images as described herein. As described earlier, by changing the artwork 60 illustrated in FIG. 4 and exposing a predetermined number of frames 90 to a first artwork and then exposing predetermined number of frames to a second artwork, a variety of entertaining configurations is achieved for placing a series of artwork images 82 within the imaging filmstrip 12. In addition, the apparatus 10 provides an efficient way of pre-exposing unexposed bulk filmstrip 16 for subsequent cutting into predetermined filmstrip lengths, of 12, 24, and 36 exposures depending on the circumstances and user demand. Whether produced using the loop 14 of imaging filmstrip 12 or the platen 102 described earlier with reference to FIG. 7, it is desirable for the preexposed filmstrip 16, once cut into predetermined lengths to be loaded into a camera by the user, as will be later described, doubly exposed by the user, and removed for development into a finished desirable photograph pleasing to the user.

Figure 12:
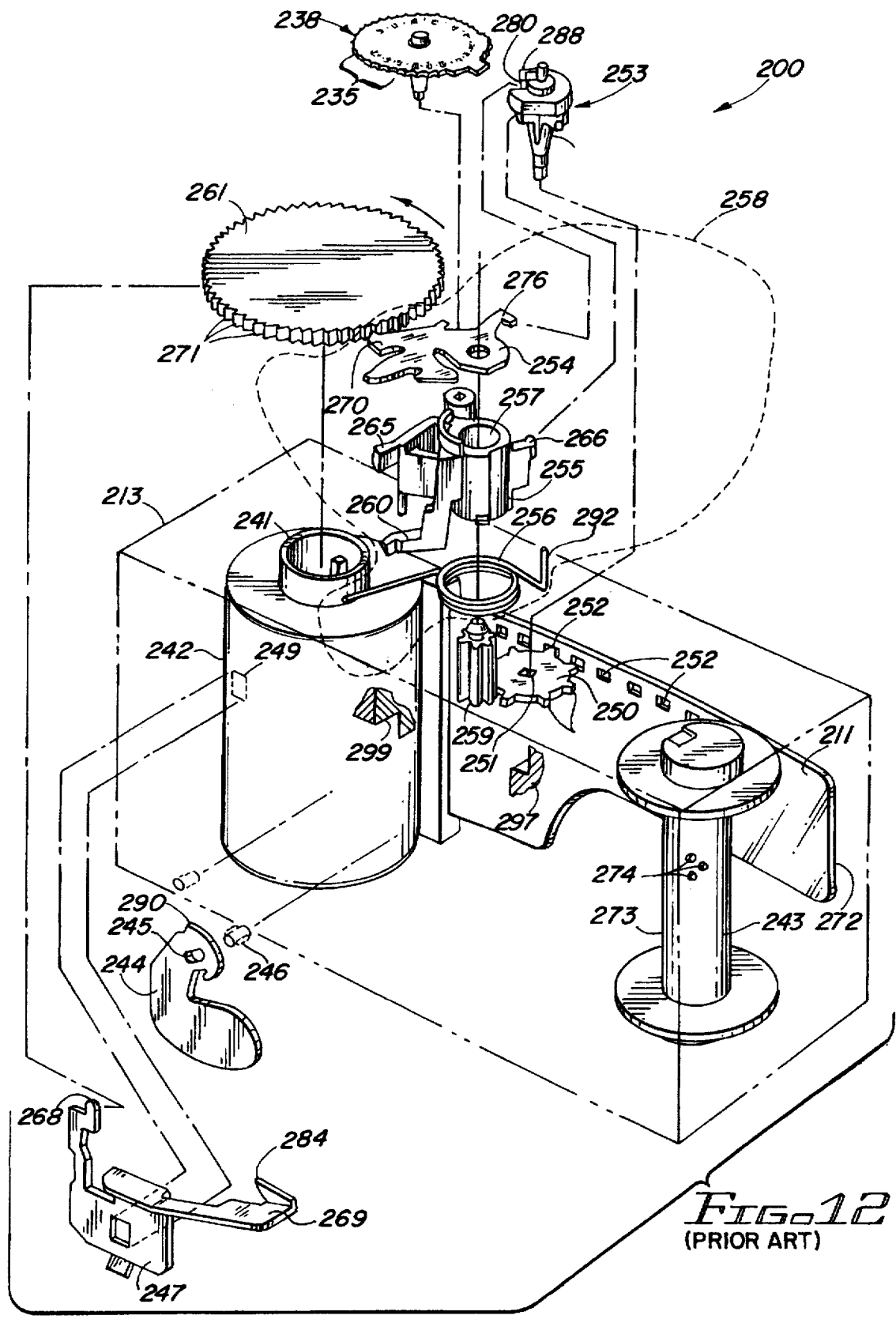
FIG. 12 is an exploded perspective view of a prior art camera mechanism and film canister.
Figure 13:
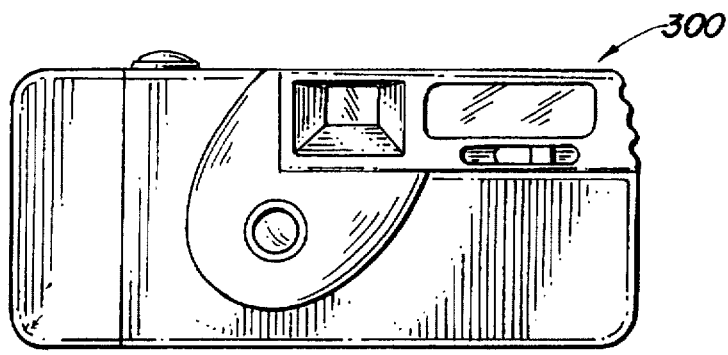
FIG. 13 is a front elevation view of a fun camera of the present invention.

Consider, by way of example, prior art technology for typical single use and recyclable cameras 200 such as described in the earlier reference Kucmerowski '366 patent reference, and as illustrated with reference to FIG. 12. An exploded perspective view discloses major components of the camera 200 including its operating mechanism within a light-tight plastic camera body 213 that are used to initially wind filmstrip 211 from canister 242 around film reel 243 and to rewind the filmstrip 211 back into the canister 242 each time an exposure of a frame is made. Shutter blade 244 contains an orifice 245 and frame post 246 is connected to the frame (not illustrated) of camera body 213. Frame post 246 is placed within orifice 245. A shutter spring (not shown) is used to hold blade 244 in the orientation shown, yet allow the blade 244 to move in a clockwise direction. Trigger latch 247 has a clicker arm 268 and trigger arm 269. Trigger arm 269 has a latch point 284. Trigger latch 247 is positioned to the frame of camera body 213 at tab 249. Sprocket 250 has an opening 251 at its center and teeth 277 along its circumference.

As illustrated again with reference to FIG. 12, cam 253 has a recess 280 and recess 281 and is dropped through a hole (not shown) in the frame of camera body 213 and pushed into opening 251 of sprocket 250. Metering lever 254 has legs 260, 265, and 266 protruding from its hub. High energy assembly 258 comprises high energy lever 255, metering lever 254, and high energy spring 256. The high energy spring 256 is assembled to high energy lever 255 and then metering lever 254 is assembled to top surface 257 of lever 255 and retained by spring leg 292 of high energy spring 256. Assembly 258 is positioned over frame post 259 of camera body 213. Then leg 298 of spring 256 is placed beneath overhanging ledge 299 which ledge 299 is located within the frame of the camera body 213. When leg 298 is placed in ledge 299, assembly 258 rotates about frame post 259 until high energy leg 260 pushes against opposite frame wall 297 of camera body 213 or leg 266 pushes against cam 253. Thumbwheel 261 is placed in an orifice in the frame of the camera body 213 so that thumbwheel teeth 271 push against anti-back-up leg 268 of trigger latch 247. In the above position, metering leg 270 of metering lever 254 is aligned with teeth 271 of the thumbwheel 261. End 272 of filmstrip 211 from cartridge 242 is pressed through slot 273 of film roll 243 and retained by pressure darts 274 that are affixed to roll 243. The cartridge 242 and film reel 243 are placed on the back of the frame of camera body 213 so that spool 241 of canister 242 meshes with a projection (not shown) on the bottom of the thumbwheel 261 by passing through an orifice in the frame of camera body 213, and film sprocket hole 252 meshes with tooth 277 of sprocket 250.

Subsequent winding of filmstrip 211 is accomplished by having the camera operator's thumb rotate thumbwheel 261 in the direction shown by arrow C. The thumbwheel 261 rotates spool 241 of canister 242, thereby pulling filmstrip 211 into the canister 242 and causing the film reel 243, sprocket 250 and cam 253 to rotate. The rotation of cam 253 causes leg 266 of high energy lever 255 to move out of recess 281 which in turn causes lever 255 to rotate thereby forcing leg 65 and leg 60 to move past trigger latch point 284 and shutter blade trip point 290, respectively.

The cam 253 makes a complete revolution during film winding. Once during each revolution, picker 288 engages a tooth 235 of exposure counter 238 and causes it to rotate one tooth position and present a new, decremental number in aperture 224. Picker 288 disengages from tooth contact at the beginning of film advance, after the previous exposure, when rotation of cam 253 drives leg 276 out of recess 280. As cam 253 continues to rotate, picker 288 comes into contact with the next tooth 235, causing counter 238 to rotate.

It can thus be realized, by way of example herein described with reference yet again to FIG. 12, and to the camera 200, that the cam 235, its recess 280, the metering lever 254, its leg 276, the sprocket 250, its teeth 277, and the sprocket center opening 251 plan an important roll in the operation of the camera for advancing the filmstrip 211 from the canister 242 onto the film reel 243 and back into the canister 242. With the double exposure method of the present invention, and the need for proper registration of the pre-exposed image with any subsequent image placed within a film frame, these camera elements play a vital roll and because of their series connections combine to provide a deleterious alignment of the multiple images places within a film frame and thus an unwanted image registration.

Further details are provided for operation of the film loading with reference to the detail description of the Kucmerowski '366 patent. Typically, initial prewinding or withdrawal of the filmstrip 211 out of the canister and onto the film reel 243 is accomplished during initial assembly by positioning the lever 255 aside where it is not touching the cam 253 and leg 70 is not touching the thumbwheel 261. The anti-back-up leg 268 is pulled away from the thumbwheel 261 thus clearing thumbwheel teeth 271. At this point, the filmstrip 211 is driven from the cartridge 242 onto the film reel 243 using a pre-wind device such as a screwdriver positioned into a bottom portion of the film reel 343 through a hole in the body 213.

With reference now to FIGS. 13–18, improvements to the camera 300 are described. Such improvements are intended for increasing the registration capabilities of a single use camera or reusable fun camera, an object of the present invention. With specific reference now to FIGS. 15a and 15b, the sprocket gear wheel 68 earlier described with reference to FIG. 10, is modified as sprocket 310 and includes a sprocket opening 312 having flat side walls 314 aligned with a reference sprocket gear tooth 316 which becomes a key reference for aligning the reference sprocket hole 96 of the pre-exposed filmstrip 17 earlier described with reference to FIGS. 8 and 9. This permits the reference tooth 316 to be in a radially outward position 318 or perpendicular relative to a camera film frame opening surface 320 over which the film 17 rests during its exposure within the camera 300. This reference tooth 316 is locked into this position 318 during loading of the film 17 into the camera 300. When compared to the earlier described camera 30 and its gear tooth 70 as earlier described with reference to FIG. 10, the tooth 316 and all of the eight sprocket teeth 317 have been increased in their width dimension 322 to reduce movement of the filmstrip 17 while the teeth 317 are within the sprocket holes. By way of example, and as illustrated again with reference to FIGS. 15a and 15b, the tooth 316 provides a close tolerance fit, eighteen thousandths of an inch in a preferred embodiment, within the hole 96.

Figure 14:
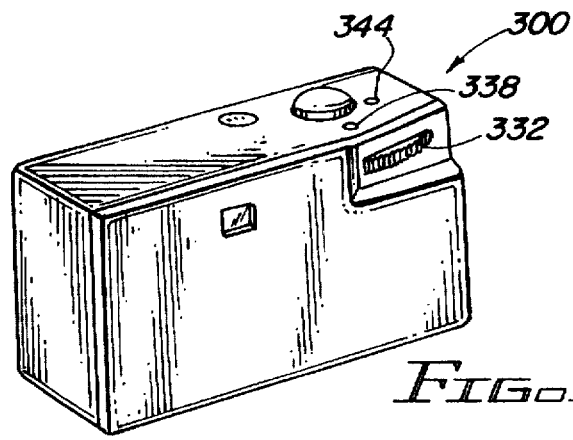
FIG. 14 is a rear perspective view of the camera of FIG. 13.
Figure 15A:
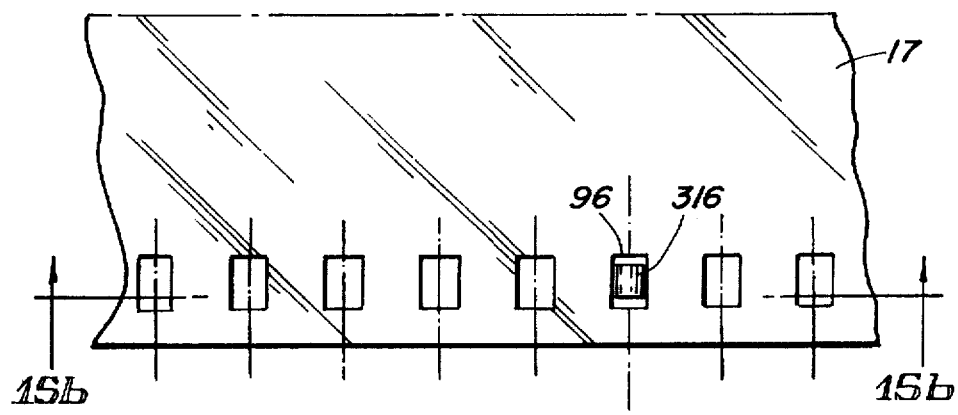
FIGS. 15a and 15b are partial exploded views of a camera sprocket of the present invention illustrating receipt of a sprocket hole of a filmstrip.
Figure 15B:
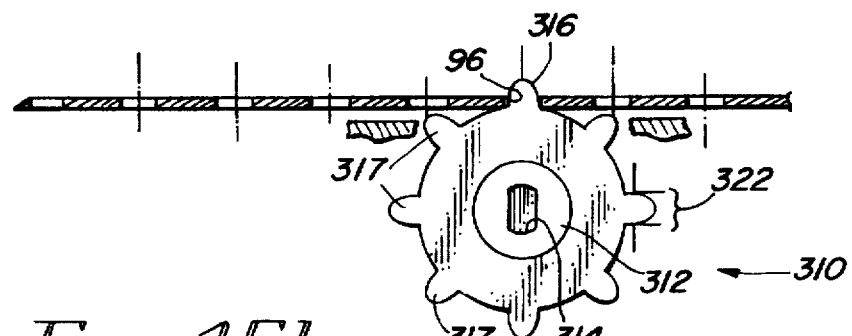
Figure 16:
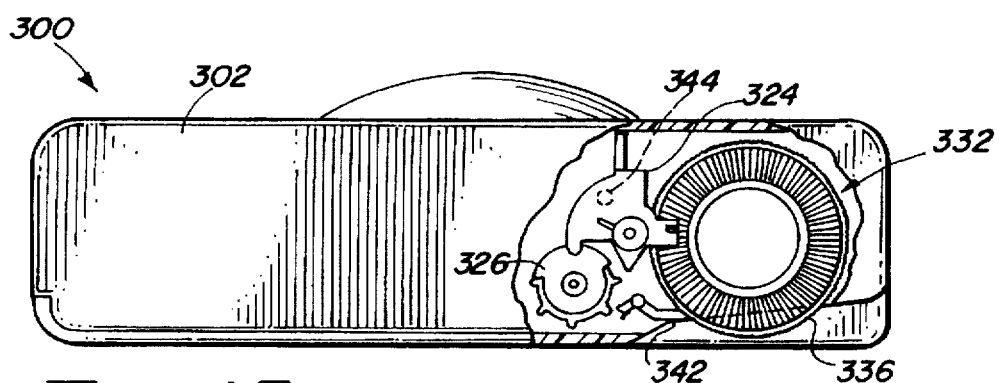
FIG. 16 is a partial top view of the camera of FIG. 13 illustrating operational elements through a fragmented camera housing portion.
Figure 17:
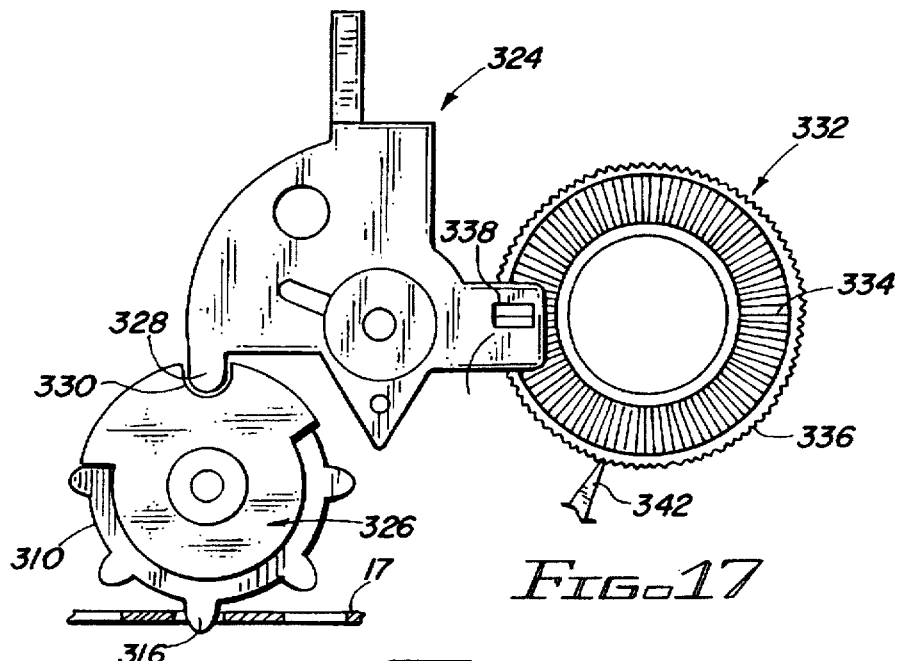
FIG. 17 is a partial top view of the operational elements of FIG. 16 illustrating cooperating operation therebetween.
Figure 18:
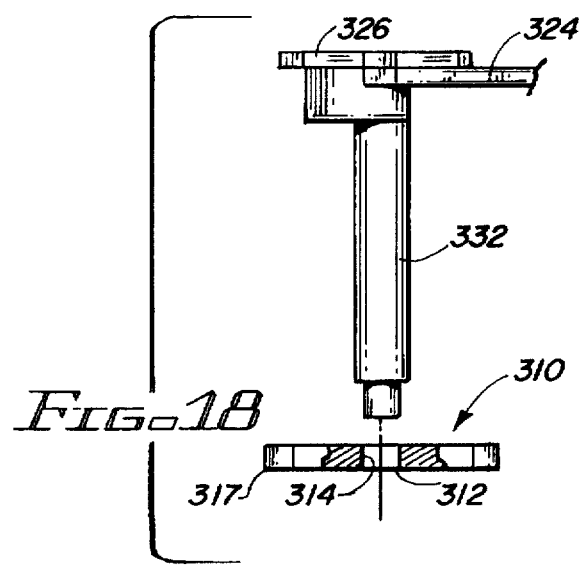
FIG. 18 is a partial exploded side view of a sprocket and spindle of FIG. 17.

As described earlier with reference to FIG. 12, the metering lever 254 and cam 253 play an important role while cooperating within the train of operating mechanism for movement and positioning of the filmstrip 211 within the camera 200, as it does with the cameras 30, 300 herein described with reference to the present invention. To further improve on the registration herein described, the metering lever or shutter activator 324 and cam or spindle 326, as herein described with reference to FIGS. 16 and 17, have been improved. The shutter activator 324 includes a leg 328 which engages a recess 330 of the spindle 326, as earlier described with reference to the cam recess 280 and metering lever leg 276 of FIG. 12. The shutter activator 324 is biased against the spindle 326 and the activator leg 328 engages the spindle 330 when the film 17 is advanced and the camera 300 made ready to shoot. This limits movement of the spindle 326 and thus the sprocket 310 which is attached the a spindle shaft 332 as illustrated with reference to FIG. 18. Further, and as illustrated with reference to FIGS. 16 and 17, a thumbwheel 332 of the present invention, includes ratchet teeth 334 along a top surface of the thumbwheel 332 as well as the outer perimeter surface 336 as is typical and as earlier described with reference to FIG. 12. The ratchet teeth 334 engage ratchet teeth 338 positioned within a second activator leg 340. Such ratchet teeth 334, 338 engagement prevents the thumbwheel 332 from advancing the film 17 until after shutter activation. As illustrated with reference to FIG. 16, a clicker arm 342 contacts the thumbwheel perimeter surface teeth 336, producing a clicking sound. A hole in the top of the camera housing 302 allows the clicker arm to be disengages from the thumbwheel 332 during a rewinding of the film 17. Further, a second access hole 344 within the housing 302, as again illustrated with reference to FIGS. 14 and 16, is used to hold the actuator 324 in a down position during film re-winding.

As illustrated again with reference to FIGS. 16 and 17, such provides a seating of the shutter activator 324 precisely within the spindle 326, thus reducing movement of the spindle 326 and sprocket 310 until shutter activation of the camera 300.

Further improvements have been made with regard to the pre-exposed film 17 loading, as described earlier with reference to FIGS. 8 and 9. By way of example, and with reference to FIG. 19, consider a pre-exposed package 400 including a roll of pre-exposed film 17 and canister 124. A method of loading the film within a camera relies on the number of sprocket holes 410 on the filmstrip 17. The number of sprocket holes on the master or loop 14, earlier described, the position of a key sprocket hole 412 having a notch 414, the number of revolutions that the sprocket, earlier described, makes when the film 17 in the camera 30 is being rewound, and finally the number of revolutions or partial revolutions that the sprocket makes when the extracted or rewound film is initially being wound back into the canister 124.

Consider the following steps, by way of example, for loading the pre-exposed film.

Figure 20:
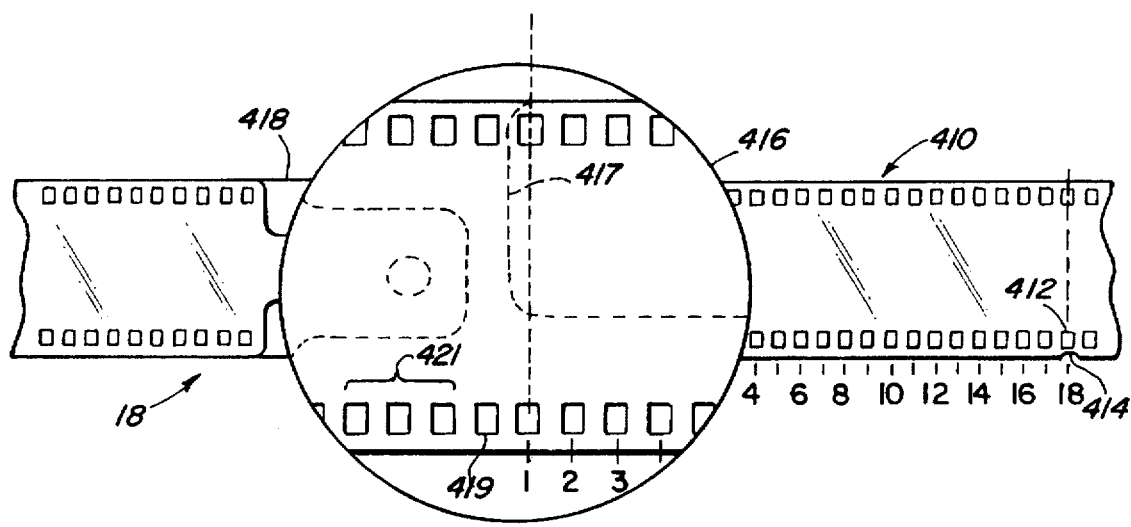
FIG. 20 is a partial exploded view of pre-exposed bulk film illustrating cut lines for providing pre-selected film exposure lengths for loading into a camera of the present invention.

Step 1: A roll of film 17, as illustrated by way of example with reference to FIG. 20, is placed within the camera 30, as was described with reference to FIG. 8.

Step 2: A tongue end 416 of the film 17 is attached to the take-up spool 116 which is placed into the camera cavity 118 with the notched sprocket hole 414 fitted with the reference sprocket gear tooth 316 on the opposite side of the shutter opening 58 from the canister 124, as earlier described with reference to FIG. 8.

Step 3: The camera back 117 is put in place to form a light-tight seal.

Step 4: A rewinding apparatus, such as a screwdriver 119, again with reference to FIG. 8, is placed on the end of the take-up spool 116 by passing through a body hole 115 to engage the spool 116 for winding the film 17 onto the spool 116. The film 17 is thus extracted from the canister 124 and wound onto the spool 116.

Step 5: When the film 17 is completely wound from the canister 124 onto the spool 116, the screwdriver 119 is removed and the thumbwheel 121, again with reference to FIG. 8, is moved for advancing the film back into the canister 124, sufficient to advance the film 17 approximately one film frame and for initializing the counter wheel 123, illustrated with reference to FIG. 9 and described earlier with reference to FIG. 12. The camera shutter is placed in a cocked or position ready to fire.

Step 6: The lens 58 is covered typically by the operator's finger and the shutter button pushed once, followed by advancement of the thumbwheel 121 for setting up the camera for use.

The procedure herein described has the number of sprocket holes 410 of the loop 14 identical to the sprocket holes of the film 17 being pre-exposed, as earlier described. By way of example, the master loop 14 will have 246 sprocket holes for a 24-exposure film 17 and 198 sprocket holes for an 18-exposure film 17. When a bulk roll of film 18, as earlier described, is imprinted, and cut into individual rolls for spooling, the cuts are always made 246 or 198 sprocket holes 410 apart. As illustrated with reference to FIG. 20, three sprocket holes 421 are typically lost in the cut portion of the canister end 418. An additional hole 419 is lost during spooking. A cut line 417 is shown as a dashed line in FIG. 20. When this canister 418 is attached to a canister spool 420, the canister 124 encloses 3 additional sprocket holes 422, as illustrated with reference again to FIGS. 21 and 22. This leaves 244 sprocket holes outside the canister 124, between a canister film entrance end 424 and the tongue end 416.

When loading the canister 124 into the camera as earlier described, the tongue end 416 will be exposed disclosing the notch 414. The reference sprocket hole 412 identified by the notch 414 is placed on the reference gear tooth 316. The position of the sprocket hole 412 holding the key or reference tooth 316 and its position relative to the camera film frame is important in determining the proper position of the film 17 for registration of the pre-exposed image 423 within the camera film frame, the exposed image 423 having been positioned as earlier described with reference to the imaging filmstrip 12 and placing of its artwork image 82 onto the film 17. In the example herein described with reference to FIG. 21, the number of sprocket holes from the edge of the canister film entrance 424 to the camera frame opening 34, is two and the number of sprocket holes from the canister 124 to the locked upright reference tooth 316 is four, when the film 17 is fully extracted from the canister 124, as earlier described. Upon the first advancing of the thumbwheel 121, pulling the film 17 back into the canister 124, the sprocket makes a full revolution moving its eight teeth 317 plus an additional tooth before locking in the ready-to-fire position. Therefore, a total of nine sprocket holes will move into the canister 124. From this point on, the camera will advance one full revolution using the eight sprocket teeth 317, or the equivalent of one film frame for 35 mm film. By accounting for the movement of the film 17 into the canister 124 and the number of sprocket holes advancing into the canister, the location of the pre-exposed film frames, including the artwork as earlier described, are located for proper alignment and registration with the camera film frame opening 34. Such is the case for the film frame opening 34a illustrated again with reference to FIG. 21, as described earlier with reference to the shield 32a of FIG. 3a, or the mask 32, described with reference to FIGS. 2 and 9. By design, the camera will always advance the film eight sprocket holes at a time into the canister 124. Therefore, by multiplying the eight sprocket holes by the number of desired exposures on a roll of film 17, the exact location of the key sprocket hole 112, as earlier described, can be punched with the notch 120 during the pre-exposure process. The distance from the notch 120 outward along the tongue 416 provides the film edge leader 426 for threading into the take-up spool 116 discussed with reference to FIG. 21.

Figure 22A:
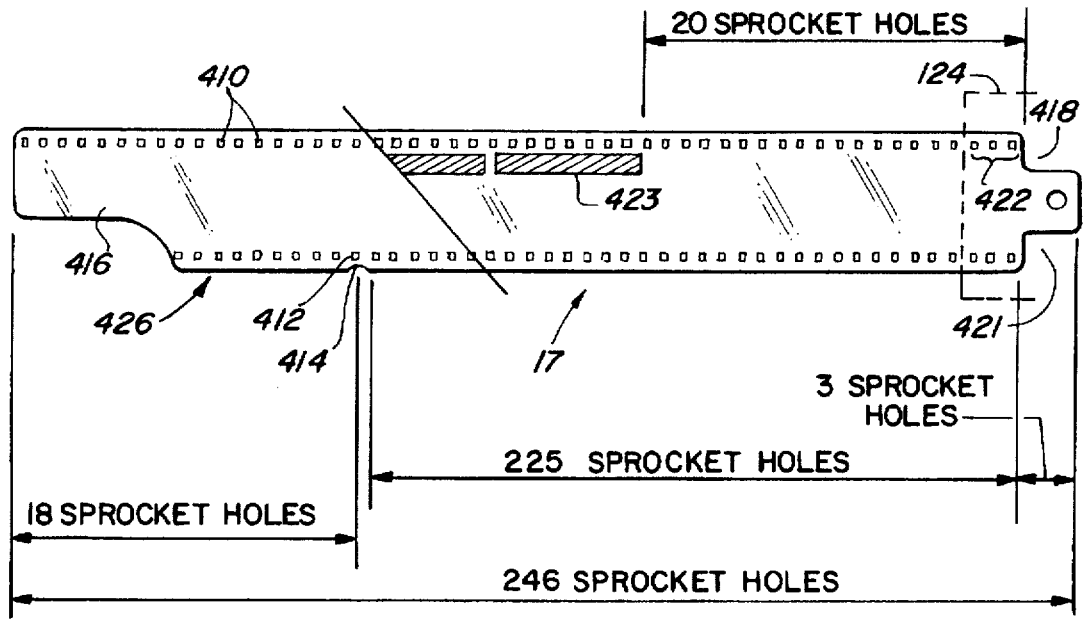
FIGS. 22a and 22b are fragmented plan views of 24-exposure and 18-exposure pre-exposed film of the present invention.
Figure 22B:
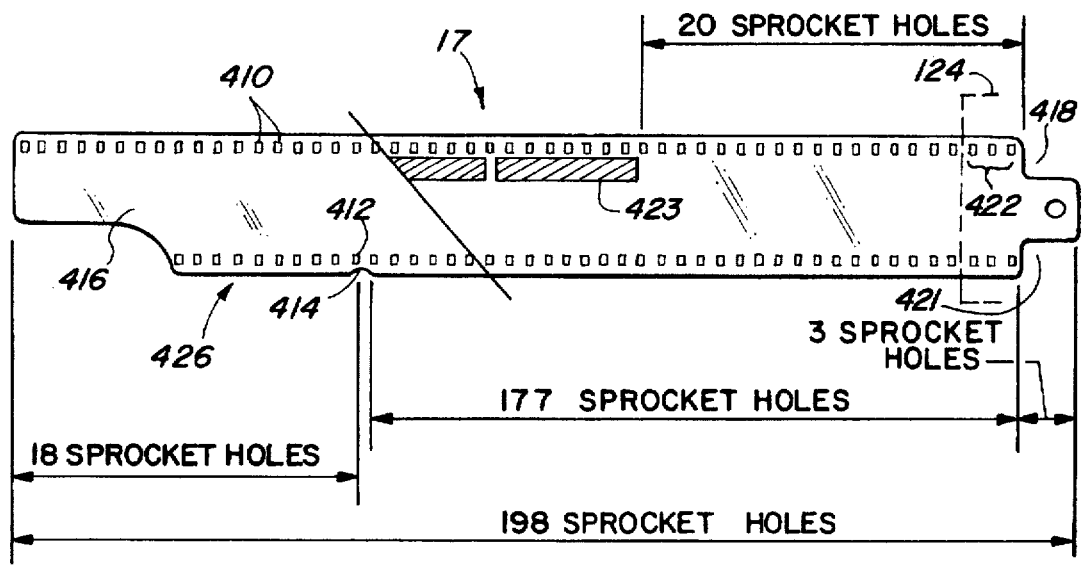

As illustrated with reference to FIGS. 22a and 22b for 24-exposure and 18-exposure pre-exposed film 17, 246 sprocket holes for 24-exposure film and 198 sprocket holes for 18-exposure film will be counted for proper positioning of the film 17 within the camera 300. The film leader 426 includes 40 holes; the canister 124 includes 3 holes; 9 holes are used in advancing the film for the first exposure within the camera; 2 holes are between the canister entrance 424 and the first exposed frame 34a (as earlier described with reference to FIG. 21); and 192 holes (for 24-exposure), and 144 holes (for 18-exposure) are used for the frames exposed by the user. As further identified with reference to FIGS. 22a and 22b, 18 holes lie between the film end and the notch 414.

The key sprocket hole 112 may be any number typically between hole 193 and the tongue as long as it is in a series of eight as measured from the 16th hole at the canister end 418. By way of examples, sprocket holes 200, 208, 216, 224, 232 and 240 can be notched to indicate the reference sprocket hole 112 showing the user where to place the film when referencing the reference sprocket hole 112 to the reference tooth 316.

By way of further example, and to illustrate one preferred operation of the camera 300 by a user selecting a particular pre-exposed film 17 for use with a pre-selected mask 32, 32a, 32b, consider the following loading steps:

Step 1: Loading sprocket hole onto the notch, by this example, would be the 18th hole from the tongue end. This would be loaded on the main sprocket gear reference tooth 316, which in one embodiment of the present invention has a special identifiable color. This tooth 316, as earlier described, is locked in an "up" position for the initial loading, as earlier described with reference to FIGS. 15a and 15b. This procedure takes place in the light. The tongue of the film is attached to the take-up spool 116 as earlier described.

Step 2: The camera back is then placed on the camera for providing a light-tight package 300.

Step 3: The rewinding device, earlier described with reference to FIG. 8, is set on the take-up spool 116 and rewound counter-clockwise to the fullest extent. The camera is advanced with the thumbwheel 332, as earlier described, to the first locked position advancing the film nine sprocket holes.

Step 4: The shutter is fired and the film advanced eight holes, one frame.

Finally, Step 5: Allowing for the film advanced into the cassette and a two-hole space between the cassette entrance 424 and the film opening, pre-exposed artwork would begin between holes number 13 and 14 and extend one frame to holes number 21 and 22, and every eight sprocket holes from then on. With such movement of the film and the sprocket hole counting as herein described, aligning of pre-exposed film frames having the pre-exposed latent image, earlier described, places pre-exposed film frame in proper registration for providing a pleasing doubly-exposed film frame.

While specific embodiments of the invention have been described in detail hereinabove, it is to be understood that various modifications may be made from the specific details described herein without departing from the spirit and scope of the invention as set forth in the appended claims. By way of further example, reference marks along various pre-exposed filmstrips such as used in current advanced photo systems (APS) is anticipated. Thus, in addition to the information built in to camera film drives using APS film, positioning information is provided to the user for creating fun photographs using the double exposure methods herein described with reference to the present invention.

Having now described the invention, the construction, the operation and methods of use of the preferred embodiments thereof, and the advantageous new and useful results obtained thereby, the new and useful methods and construction and reasonable equivalents thereof obvious to those skilled in the art, are set forth in the appended claims.

What is claimed is:

1. A photographic film double exposure method comprising the steps of:

providing an imaging filmstrip having a series of film frames, each frame having a masking portion and an artwork portion, the artwork portion having an artwork image;

forming a continuous imaging filmstrip loop by connecting opposing ends of the imaging filmstrip;

providing a supply reel having a roll of unexposed bulk film thereon;

placing a light source proximate a first imaging filmstrip side;

feeding the unexposed bulk film proximate a second imaging filmstrip side the second imaging filmstrip side opposing the first imaging filmstrip side;

exposing the unexposed bulk film to the light source thus placing a latent image of the imaging filmstrip artwork image onto the bulk film thus forming pre-exposed bulk film;

rotating the filmstrip loop for progressively placing the series of frames thereon proximate the unexposed bulk film thus exposing the bulk film to the series of artwork images;

punching a notch at pre-selected locations along the pre-exposed bulk film, each notch positioned proximate a reference sprocket hole;

feeding the pre-exposed bulk film onto a take-up reel;

cutting the pre-exposed bulk film into pre-exposed filmstrips, each having a preselected length and number of frames, each pre-exposed filmstrip having at least one notch proximate a pre-exposed filmstrip leader end;

loading the pre-exposed filmstrip into a light tight film canister, the pre-exposed filmstrip having a portion of the leader end extending out of the canister;

providing a camera having a sprocket gear wheel communicating with a thumbwheel for advancing the pre-exposed filmstrip between the canister and a take-up spool, the sprocket gear wheel having a reference gear tooth;

locking the sprocket gear wheel for positioning the reference tooth for receiving the pre-exposed filmstrip reference sprocket hole;

placing an overlay onto the camera film frame opening, the overlay having a shield portion for preventing exposure of the pre-exposed filmstrip latent artwork image during operation of the camera, the overlay having a formed frame opening for exposing the unexposed portion of the pre-exposed filmstrip;

loading the film canister into the camera;

pulling the filmstrip leader end over the overlay and camera frame opening;

positioning the reference sprocket hole onto the reference gear tooth;

feeding the leader end of the pre-exposed filmstrip into the take-up spool;

closing the camera for operation in doubly exposing the pre-exposed filmstrip;

winding the pre-exposed filmstrip from the canister onto the take-up spool;

continuing the winding for a predetermined length of filmstrip;

advancing the filmstrip into the canister for placing a frame to be doubly expose across the film frame opening;

initializing a film wheel counter for identifying the filmstrip frame being exposed;

operating the camera for doubly exposing a first frame;

continuing the advancing and operating steps for doubly exposing the series of preselected frames while shielding the latent image within each frame;

fully winding the doubly exposed filmstrip into the canister; and removing the canister from the camera for developing the doubly exposed filmstrip.

2. The photographic film double exposure method according to claim 1, wherein the imaging filmstrip providing step comprises the steps of:

loading an unexposed alignment filmstrip into the camera having the overlay mounted therein for operation of the camera in exposing the unexposed alignment filmstrip;

photographing a light source using the camera and the alignment filmstrip therein for exposing the alignment filmstrip to the light source;

developing the alignment filmstrip for forming a film frame within the alignment filmstrip having a transparent portion corresponding to the artwork portion shielded from the exposure to the light source by the overlay shied portion;

placing the developed alignment filmstrip into a copy camera;

mounting the copy camera onto a copy stand at a predetermined distance from a base of the copy stand;

placing artwork to be photographed onto the base for viewing the artwork through the transparent portion of the alignment filmstrip;

removing the alignment filmstrip from the copy camera;

loading unexposed imaging filmstrip into the copy camera for photographing the artwork;

photographing the artwork thus placing a latent image of the artwork onto the imaging filmstrip; and developing the imaging filmstrip for providing the artwork image thereon.

3. The photographic film double exposure method according to claim 1, wherein the imaging filmstrip providing step comprises the steps of:

providing a graphics computer for creating the artwork image;

creating the artwork image;

providing a film recorder;

operating the film recorder for placing a latent image of the artwork image onto an unexposed imaging filmstrip; and developing the imaging filmstrip for providing the artwork image thereon.

4. The photographic film double exposure method according to claim 1, wherein the filmstrip comprises sprocket holes positioned along an edge of the filmstrip and the filmstrip advancing step comprises the step of advancing the filmstrip along a longitudinal distance including eight sprocket hole, the distance corresponding to a distance between corresponding portions of the film frame, thus by advancing in increments of eight sprocket holes, each pre-exposed frame is positioned over the camera frame opening with each advancing step.

5. A photographic film double exposure method comprising the steps of:

providing an imaging filmstrip having a series of film frames, each frame having a masking portion and an artwork portion, the artwork portion having an artwork image;

forming a continuous imaging filmstrip loop by connecting opposing ends of the imaging filmstrip;

providing unexposed bulk film;

placing a light source proximate the imaging filmstrip side;

feeding the unexposed bulk film proximate a second imaging filmstrip side the second imaging filmstrip side opposing the first imaging filmstrip side;

exposing the unexposed bulk film to the light source thus placing a latent image of the imaging filmstrip artwork image onto the bulk film thus forming pre-exposed bulk film;

circulating the filmstrip loop for progressively placing the series of frames thereon proximate the unexposed bulk film thus exposing the bulk film to the series of artwork images;

punching a notch at pre-selected locations along the pre-exposed bulk film, each notch positioned proximate a reference sprocket hole; and cutting the pre-exposed bulk film into pre-exposed filmstrips, each having a preselected length and number of frames, each pre-exposed filmstrip having at least one notch proximate a pre-exposed filmstrip leader end.

6. The photographic film double exposure method according to claim 5, further comprising the steps of:

loading the pre-exposed filmstrip into a light tight film canister, the pre-exposed filmstrip having a portion of the leader end extending out of the canister;

providing a camera having a sprocket gear wheel communicating with a thumbwheel for advancing the pre-exposed filmstrip between the canister and a take-up spool, the sprocket gear wheel having a reference gear tooth;

locking the sprocket gear wheel for positioning the reference tooth for receiving the pre-exposed filmstrip reference sprocket hole;

placing an overlay onto the camera film frame opening, the overlay having a shielded portion for preventing exposure of the pre-exposed filmstrip latent artwork image during operation of the camera, the overlay having a formed frame opening for exposing the unexposed portion of the pre-exposed filmstrip;

loading the film canister into the camera;

pulling the filmstrip leader end over the overlay and camera frame opening;

positioning the reference sprocket hole onto the reference gear tooth;

feeding the leader end of the pre-exposed filmstrip into the take-up spool;

closing the camera for operation in doubly exposing the pre-exposed filmstrip;

winding the pre-exposed filmstrip from the canister onto the take-up spool;

continuing the winding for a predetermined length of filmstrip;

advancing the filmstrip into the canister for placing a frame to be doubly exposed across the film frame opening;

operating the camera for doubly exposing a first frame; and continuing the advancing and operating steps for doubly exposing the series of preselected frames while shielding the latent image within each frame.

7. The photographic film double exposure method according to claim 5, wherein the imaging filmstrip providing step comprises the steps of:

loading an unexposed alignment filmstrip into the camera having the overlay mounted therein for operation of the camera in exposing the unexposed alignment filmstrip;

photographing a light source using the camera and the alignment filmstrip therein for exposing the alignment filmstrip to the light source;

developing the alignment filmstrip for forming a film frame within the alignment filmstrip having a transparent portion corresponding to the artwork portion shielded from the exposure to the light source by the overlay shied portion;

placing the developed alignment filmstrip into a copy camera;

mounting the copy camera onto a copy stand at a predetermined distance from a base of the copy stand;

placing artwork to be photographed onto the base for viewing the artwork through the transparent portion of the alignment filmstrip;

removing the alignment filmstrip from the copy camera;

loading unexposed imaging filmstrip into the copy camera for photographing the artwork;

photographing the artwork thus placing a latent image of the artwork onto the imaging filmstrip; and developing the imaging filmstrip for providing the artwork image thereon.

8. The photographic film double exposure method according to claim 5, wherein the imaging filmstrip providing step comprises the steps of:

providing a graphics computer for creating the artwork image;

creating the artwork image;

providing a film recorder;

operating the film recorder for placing a latent; image of the artwork image onto an unexposed imaging filmstrip; and developing the imaging filmstrip for providing the artwork image thereon.

9. A photographic film double exposure method comprising the steps of:

providing an imaging filmstrip having a film frame including a masking portion and an artwork portion, the artwork portion having an artwork image;

providing an unexposed filmstrip placed surface to surface in juxtaposition with the imaging filmstrip;

exposing the unexposed bulk film to light for placing a latent image of the imaging filmstrip artwork image onto the unexposed filmstrip;

placing a latent image of the imaging filmstrip artwork image onto the unexposed filmstrip thus forming a pre-exposed filmstrip;

loading the pre-exposed filmstrip into a camera having a film frame opening for exposing an unexposed portion of the pre-exposed filmstrip, the camera film frame opening having a shield portion for preventing exposure of the pre-exposed filmstrip latent artwork image during operation of the camera;

closing the camera for operation in doubly exposing the pre-exposed filmstrip;

placing a frame to be doubly exposed across the film frame opening; and operating the camera for doubly exposing a first frame.

10. The photographic film double exposure method according to claim 9, further comprising the steps of:

forming a continuous imaging filmstrip loop by connecting opposing ends of the imaging filmstrip;

providing a supply reel having a roll of unexposed bulk film thereon;

feeding the unexposed bulk film proximate a second imaging filmstrip side the second imaging filmstrip side opposing the first imaging filmstrip side;

exposing the unexposed bulk film to light to light thus placing a latent image of the imaging filmstrip artwork image onto the bulk film thus forming pre-exposed bulk film;

rotating the filmstrip loop for progressively placing the series of frames thereon proximate the unexposed bulk film thus exposing the bulk film to the series of artwork images;

punching a notch at pre-selected locations along the pre-exposed bulk film, each notch positioned proximate a reference sprocket hole;

feeding the pre-exposed bulk film onto a take-up reel; and cutting the pre-exposed bulk film into the pre-exposed filmstrips, each having a preselected length and number of frames, each pre-exposed filmstrip having at least one notch proximate a pre-exposed filmstrip leader end.

11. The photographic film double exposure method according to claim 10, further comprising the steps of:

loading the pre-exposed filmstrip into a light tight film canister, the pre-exposed filmstrip having a portion of the leader end extending out of the canister;

providing the camera having a sprocket gear wheel communicating with a thumbwheel for advancing the pre-exposed filmstrip between the canister and a take-up spool, the sprocket gear wheel having a reference gear tooth;

locking the sprocket gear wheel for positioning the reference tooth for receiving the pre-exposed filmstrip reference sprocket hole;

loading the film canister into the camera;

pulling the filmstrip leader end over the overlay and camera frame opening;

positioning the reference sprocket hole onto the reference gear tooth; and feeding the leader end of the pre-exposed filmstrip into the take-up spool.

12. The photographic film double exposure method according to claim 9, wherein the imaging filmstrip providing step comprises the steps of:

loading an unexposed alignment filmstrip into the camera having the overlay mounted therein for operation of the camera in exposing the unexposed alignment filmstrip;

photographing a light source using the camera and the alignment filmstrip therein for exposing the alignment filmstrip to the light source;

developing the alignment filmstrip for forming a film frame within the alignment filmstrip having a transparent portion corresponding to the artwork portion shielded from the exposure to the light source by the overlay shied portion;

placing the developed alignment filmstrip into a copy camera;

mounting the copy camera onto a copy stand at a predetermined distance from a base of the copy stand;

placing artwork to be photographed onto the base for viewing the artwork through the transparent portion of the alignment filmstrip;

removing the alignment filmstrip from the copy camera;

loading unexposed imaging filmstrip into the copy camera for photographing the artwork;

photographing the artwork thus placing a latent image of the artwork onto the imaging filmstrip; and developing the imaging filmstrip for providing the artwork image thereon.

13. The photographic film double exposure method according to claim 9, wherein the imaging filmstrip providing step comprises the steps of:

providing a graphics computer for creating the artwork image;

creating the artwork image;

providing a film recorder;

operating the film recorder for placing a latent image of the artwork image onto an unexposed imaging filmstrip; and developing the imaging filmstrip for providing the artwork image thereon.

14. A photographic apparatus for double exposure of photographic film, the apparatus comprising:

an imaging filmstrip having a series of film frames, each frame having a masking portion and an artwork portion, the artwork portion having an artwork image, the imaging filmstrip formed into a loop by connecting opposing ends of the imaging filmstrip;

unexposed bulk film;

a light source positioned proximate the imaging filmstrip for exposing the unexposed bulk film to the light source and placing a latent image of the imaging filmstrip artwork image onto the bulk film thus forming pre-exposed bulk film;

film feeding means for rotating the filmstrip loop for progressively placing the series of frames thereon proximate the unexposed bulk film thus exposing the bulk film to the series of artwork images, the feeding means further feeding the bulk film for pre-exposing the bulk film; and punching means for punching a notch at pre-selected locations along the pre-exposed bulk film, each notch positioned proximate a reference sprocket hole for subsequent cutting of the pre-exposed bulk film into preselected pre-exposed filmstrip for operation in a camera.

15. The apparatus according to claim 14, wherein the imaging filmstrip is formed by the steps of:

loading an unexposed alignment filmstrip into the camera having the overlay mounted therein for operation of the camera in exposing the unexposed alignment filmstrip;

photographing a light source using the camera and the alignment filmstrip therein for exposing the alignment filmstrip to the light source;

developing the alignment filmstrip for forming a film frame within the alignment filmstrip having a transparent portion corresponding to the artwork portion shielded from the exposure to the light source by the overlay shied portion;

placing the developed alignment filmstrip into a copy camera;

mounting the copy camera onto a copy stand at a predetermined distance from a base of the copy stand;

placing artwork to be photographed onto the base for viewing the artwork through the transparent portion of the alignment filmstrip;

removing the alignment filmstrip from the copy camera;

loading unexposed imaging filmstrip into the copy camera for photographing the artwork;

photographing the artwork thus placing a latent image of the artwork onto the imaging filmstrip; and developing the imaging filmstrip for providing the artwork image thereon.

16. The apparatus according to claim 14, wherein the imaging filmstrip is formed by the steps of:

providing a graphics computer for creating the artwork image;

creating the artwork image;

providing a film recorder;

operating the film recorder for placing a latent image of the artwork image onto an unexposed imaging filmstrip; and developing the imaging filmstrip for providing the artwork image thereon.

17. A photographic apparatus for double exposure of photographic film, the apparatus comprising:

an imaging filmstrip having a series of film frames, each frame having a masking portion and an artwork portion, the artwork portion having an artwork image;

a light source positioned proximate the imaging filmstrip for exposing unexposed film to the light source and plating a latent image of the imaging filmstrip artwork image onto the film thus forming pre-exposed film; and film positioning means for positioning the imaging filmstrip for placing the series of frames thereon proximate the unexposed film for thus exposing the film to the series of artwork images, the feeding means further feeding the film for pre-exposing the film.

18. The apparatus according to claim 17, further comprising punching means for punching a notch at pre-selected locations along the pre-exposed film, each notch positioned proximate a reference sprocket hole for subsequent cutting of the pre-exposed bulk film into preselected pre-exposed filmstrip for operation in a camera.

19. The apparatus according to claim 17, wherein the imaging filmstrip is formed by the steps of:

loading an unexposed alignment filmstrip into the camera having the overlay mounted therein for operation of the camera in exposing the unexposed alignment filmstrip;

photographing a light source using the camera and the alignment filmstrip therein for exposing the alignment filmstrip to the light source;

developing the alignment filmstrip for forming a film frame within the alignment filmstrip having a transparent portion corresponding to the artwork portion shielded from the exposure to the light source by the overlay shied portion;

placing the developed alignment filmstrip into a copy camera;

mounting the copy camera onto a copy stand at a predetermined distance from a base of the copy stand;

placing artwork to be photographed onto the base for viewing the artwork through the transparent portion of the alignment filmstrip;

removing the alignment filmstrip from the copy camera;

loading unexposed imaging filmstrip into the copy camera for photographing the artwork;

photographing the artwork thus placing a latent image of the artwork onto the imaging filmstrip; and developing the imaging filmstrip for providing the artwork image thereon.

20. The apparatus according to claim 17, wherein the imaging filmstrip is formed by the steps of:

providing a graphics computer for creating the art work image;

creating the artwork image;

providing a film recorder;

operating the film recorder for placing a latent image of the artwork image onto an unexposed imaging filmstrip; and developing the imaging filmstrip for providing the artwork image thereon.

* * * * *